(12) United States Patent
Tsukagoshi et al.

(10) Patent No.: US 7,525,894 B2
(45) Date of Patent: Apr. 28, 2009

(54) APPARATUS AND METHOD FOR RECORDING AND REPRODUCING OPTICAL INFORMATION

(75) Inventors: Takuya Tsukagoshi, Tokyo (JP); Yuichi Sato, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 462 days.

(21) Appl. No.: 10/889,076

(22) Filed: Jul. 13, 2004

(65) Prior Publication Data

US 2006/0013103 A1 Jan. 19, 2006

(51) Int. Cl.
G11B 7/00 (2006.01)

(52) U.S. Cl. ............... 369/103; 359/10; 369/112.17

(58) Field of Classification Search ............. 369/103; 359/9, 10, 14, 15, 23, 24, 25, 35, 22; 365/216, 365/234
See application file for complete search history.

(56) References Cited

U.S. PATENT DOCUMENTS

| | | | | |
|---|---|---|---|---|
| 5,519,651 | A * | 5/1996 | Redfield | 365/125 |
| 5,917,798 | A | 6/1999 | Horimai et al. | |
| 6,104,511 | A | 8/2000 | Hesselink et al. | |
| 6,322,931 | B1 * | 11/2001 | Cumpston et al. | 430/1 |
| 6,538,776 | B2 * | 3/2003 | Edwards | 359/29 |
| 6,721,076 | B2 * | 4/2004 | King et al. | 359/35 |
| 6,980,337 | B2 * | 12/2005 | Roh | 359/10 |
| 7,161,723 | B1 * | 1/2007 | Silveira | 359/12 |
| 2002/0051419 | A1 * | 5/2002 | Itoh et al. | 369/103 |
| 2002/0071145 | A1 * | 6/2002 | Roh | 359/35 |
| 2003/0002424 | A1 * | 1/2003 | Temple | 369/103 |
| 2003/0039001 | A1 | 2/2003 | King et al. | |
| 2004/0027968 | A1 * | 2/2004 | Horimai | 369/103 |

FOREIGN PATENT DOCUMENTS

| | | |
|---|---|---|
| JP | 10-124872 | 5/1998 |
| JP | 2002-123161 | 4/2002 |
| JP | 2004-286883 | 10/2004 |

* cited by examiner

*Primary Examiner*—Wayne R Young
*Assistant Examiner*—Linh T Nguyen
(74) *Attorney, Agent, or Firm*—Oblon, Spivak, McClelland, Maier & Neustadt, P.C.

(57) ABSTRACT

In recording of information, an information beam as S-polarization is incident on an optical information recording medium. After passing through the optical information recording medium, the information beam is reflected by reflection apparatus and passes through a polarization controller. In this process, the information beam undergoes S-polarization control and the polarization direction changes to P-polarization direction. The information beam interferes with a recording reference beam as P-polarization incident on a surface of the optical information recording medium inside the optical information recording medium to form an interference pattern. In reproduction of information, a reproduction reference beam is incident on the surface of the optical information recording medium. The reproduction reference beam is then diffracted by a refractive index grating caused by an interference pattern formed in the optical information recording medium to form a reproduction beam. The reproduction beam is emitted from the surface of the optical information recording medium and is incident on a light receiving element. The original data is then reproduced.

14 Claims, 21 Drawing Sheets

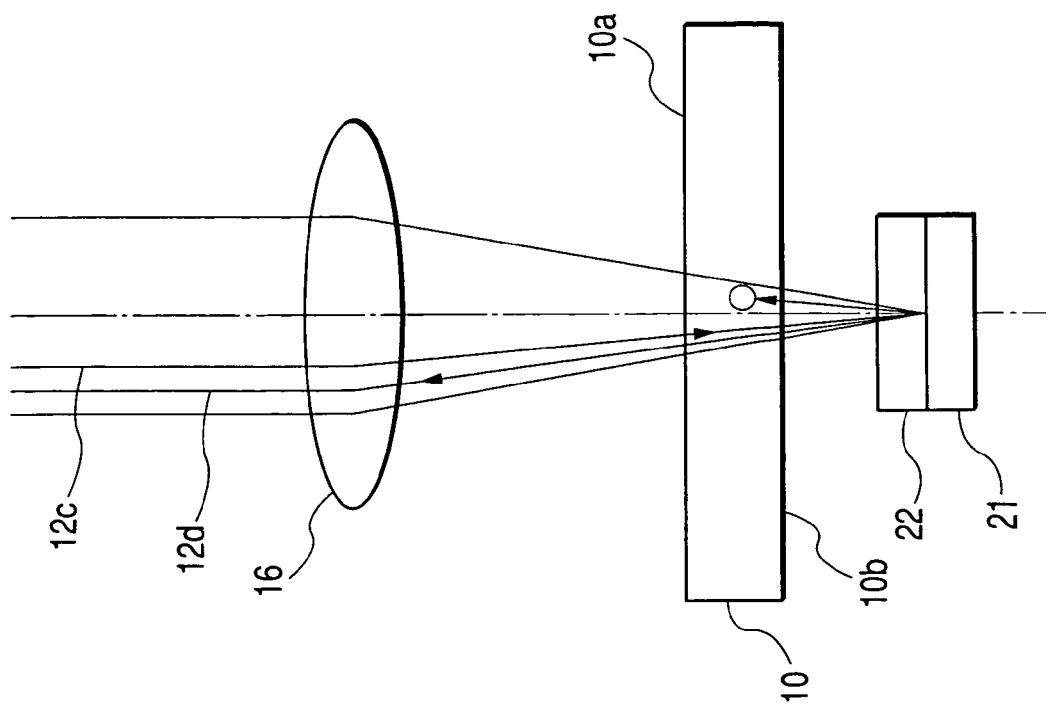
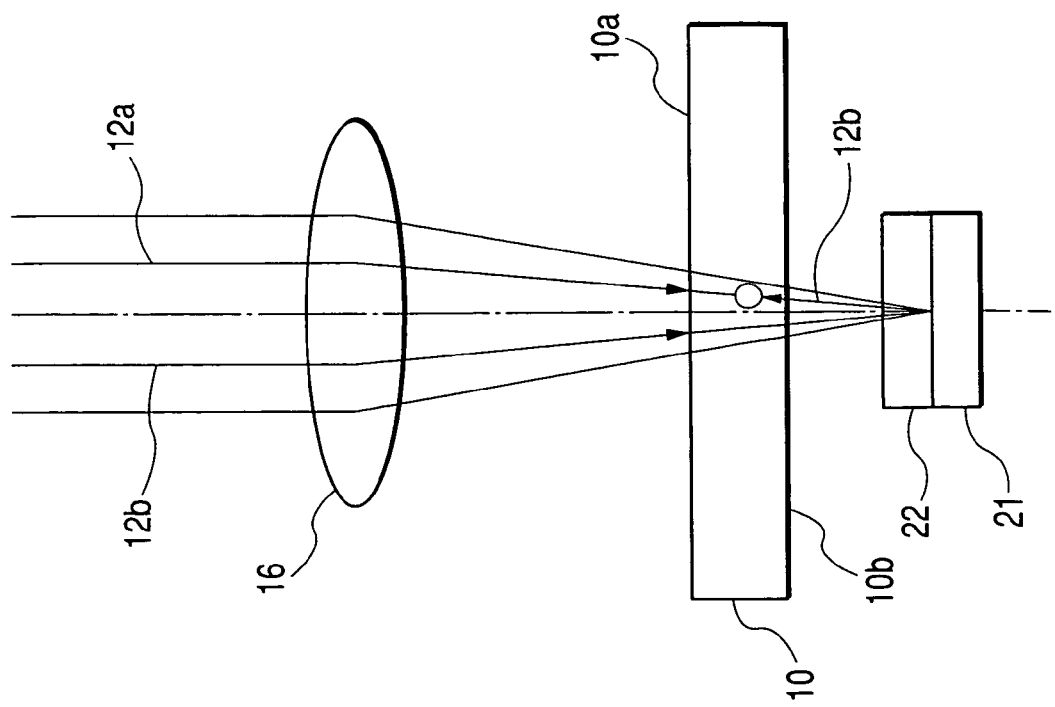

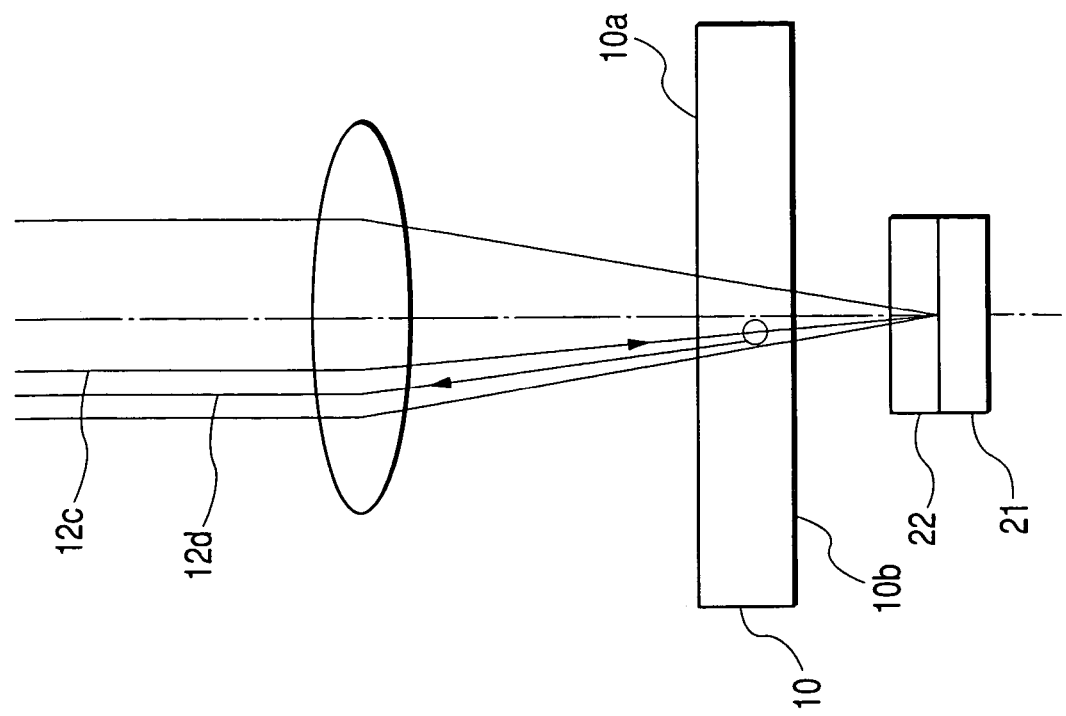
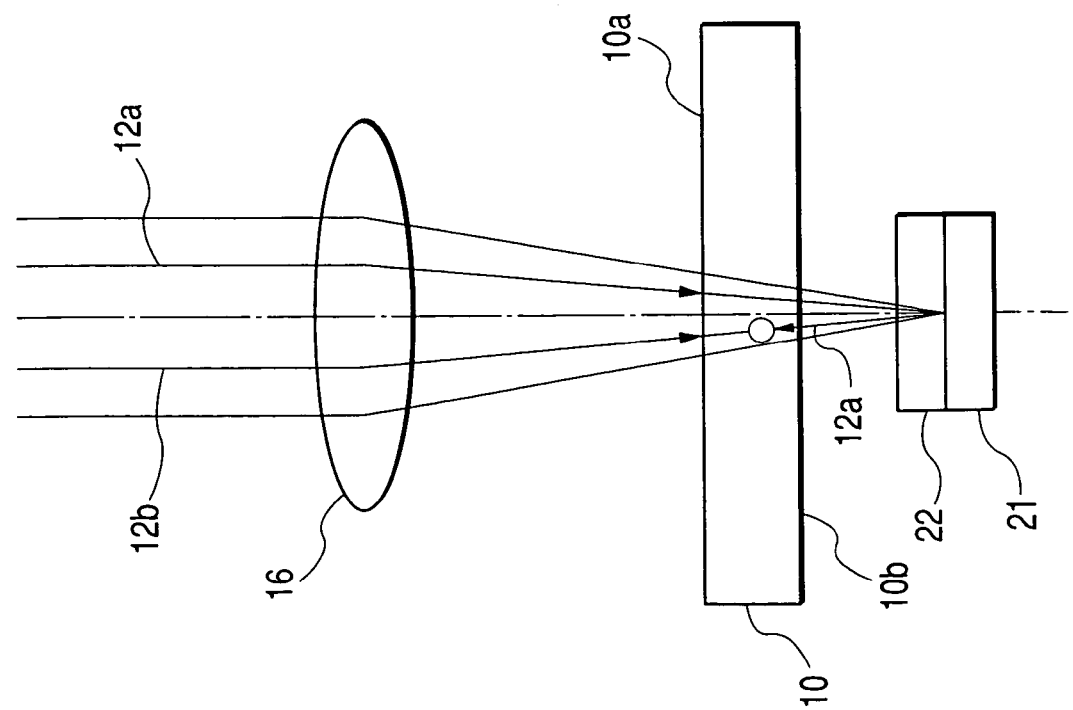

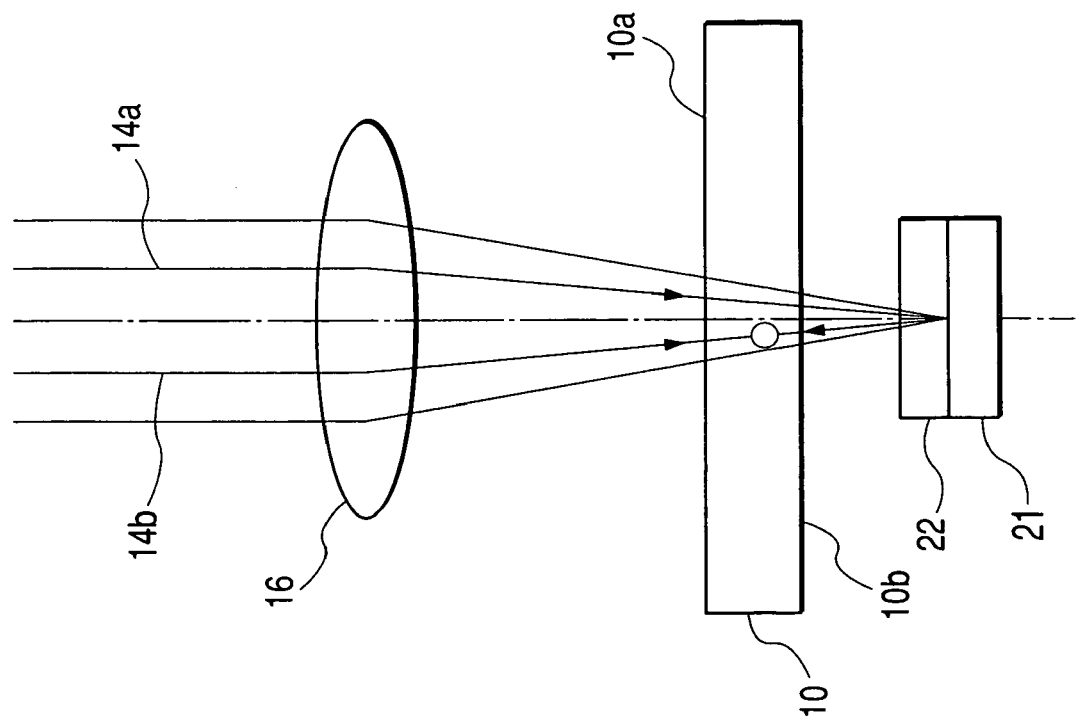
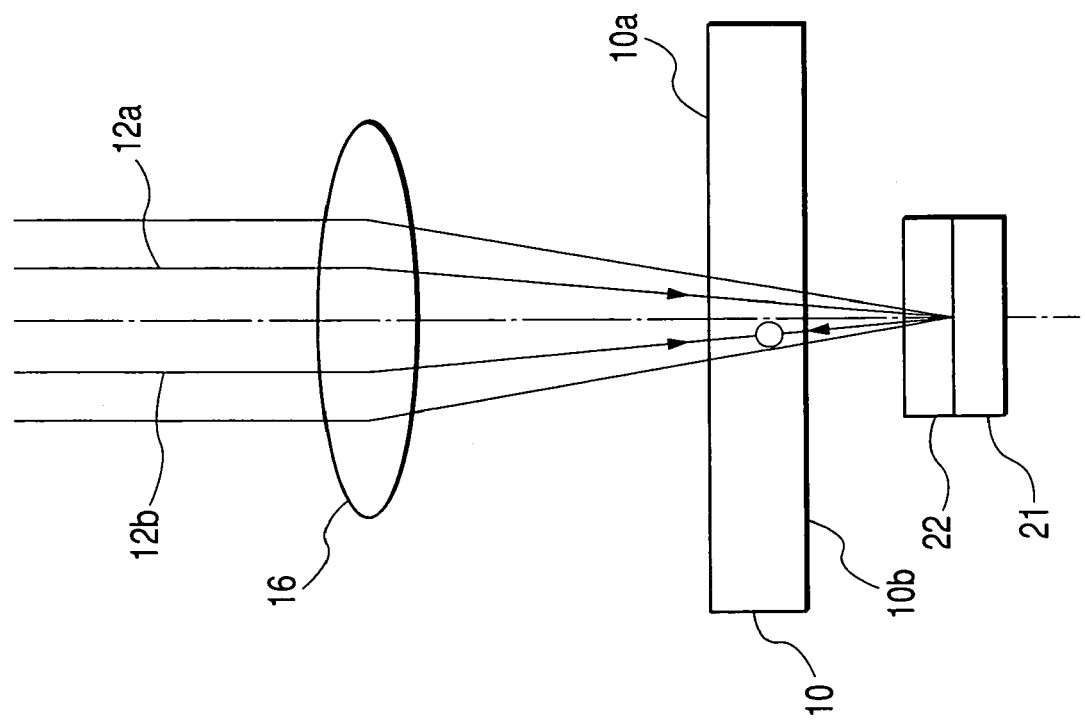

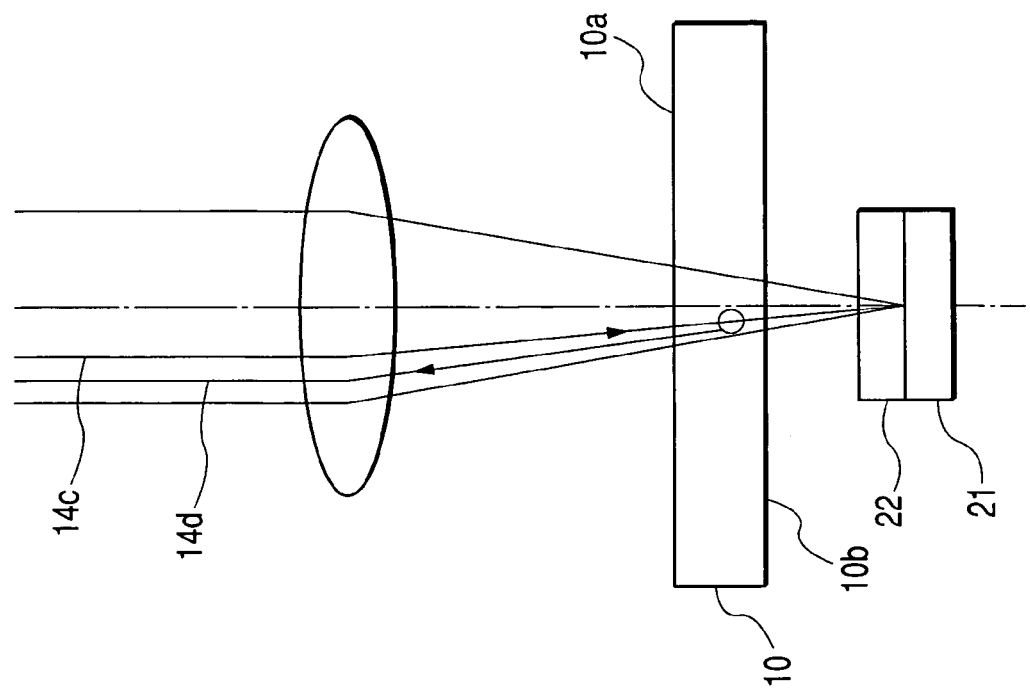
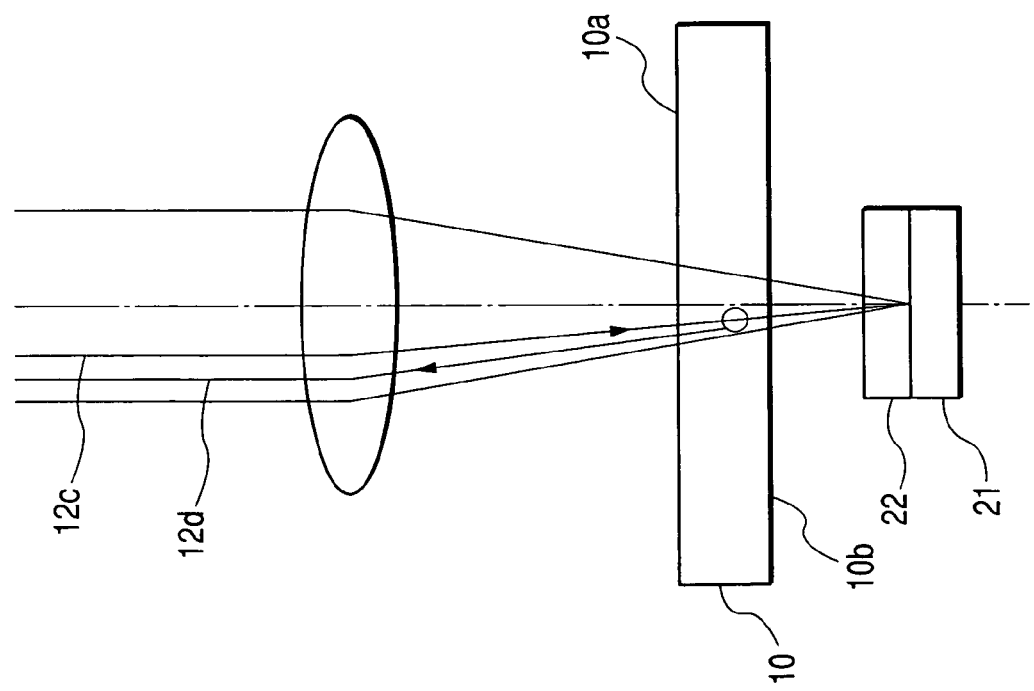

APPARATUS AND METHOD FOR RECORDING AND REPRODUCING OPTICAL INFORMATION

BACKGROUND OF THE INVENTION

The present invention relates to an optical information recording apparatus and an optical information recording method for recording information onto an optical information recording medium by using holography, optical information reproduction apparatus and an optical information reproduction method for reproducing information from an optical information recording medium by using holography, and optical information recording and reproduction apparatus for recording information onto an optical information recording medium as well as reproducing information from an optical information recording medium by using holography.

Holographic recording whereby information is recorded onto an optical information recording medium by using holography is accomplished in such a manner that a beam carrying image information (hereinafter referred to as an information beam) and a reference beam inside the optical information recording medium are overlapped and a resulting interference pattern is written onto the optical information recording medium. When the recorded information is reproduced, a reference beam is irradiated onto the optical information recording medium to reproduce the image information by way of diffraction using the interference pattern.

Such holographic recording is characterized by recording information by way of a three-dimensional pattern in the direction of thickness of an optical information recording medium and is also referred to as volume holography recording. By increasing the thickness of the recording layer of an optical information recording medium, it is possible to increase the diffraction efficiency. Further, by recording information in a multiple fashion through angular multiplexing, it is possible to increase the recording capacity.

One of the related art hologram recording and reproduction methods uses Fourier-transform processing to record and reproduce information (Japanese Patent Laid-Open No. 2002-123161). The method is described below referring to FIG. 26. As shown in FIG. 26, a luminous flux 12 emitted from a laser light source 11 is split into an information beam 12a and a recording reference beam 12b by a beam splitter 13. The information beam 12a has its beam diameter expanded by a beam expander 25 and irradiated as a parallel beam onto a spatial light modulator (SLM) 15. The spatial light modulator (SLM) 15 comprising a transmission TFT liquid crystal display (LCD) panel receives as electric signal recording data converted into a signal by an encoder and arranges the signal onto a two-dimensional plane to generate two-dimensional digital pattern information and form a pattern of light and dark dots on the plane. A single item of two-dimensional digital pattern information is called page data.

The information beam 12a, passing through the spatial light modulator (SLM) 15, undergoes optical modulation and includes a data signal component. The information beam 12a including the dot pattern signal component passes through a Fourier transform lens 30 apart by its focal length "f". In this process, the dot pattern signal component of the information beam 12a undergoes Fourier-transform processing and is condensed into an optical information recording medium.

The recording reference beam 12b split by the beam splitter 13 is guided into the optical information recording medium by mirrors 17, 18 and crosses the information beam 12a inside the optical information recording medium to form an interference pattern, which is recorded as a modulation in the refractive index.

In angular-multiplexed recording, the optical information recording medium is rotated to vary the relative angle between the recording reference beam 12b and the optical information recording medium. In this example, page data #1 through #n undergoes angularly multiplexed recording onto the same optical information recording medium. Based on the page data #1, the light-transmission or light-interception state is selected per pixel by the spatial light modulator (SLM) 15 to generate the spatially modulated information bean 12a and irradiate the information beam 12a onto the optical information recording medium. At the same time, a recording reference beam 12b is irradiated from a direction θ1 (not shown) onto the optical information recording medium and an interference pattern produced by overlaying the information beam 12a on the recording reference beam 12b in the optical information recording medium is recorded.

In recording the next page data #2, the optical information recording medium is rotated by a predetermined angle and a recording reference beam 12b is irradiated at an angle θ2 different from θ1 and the recording reference beam 12b is overlaid on the information beam 12a to perform multiple recording of information onto the same optical information recording medium. Similarly, in recording of the remaining page data #3 through #n, the recording reference beam 12b is irradiated at different angles θ3 through θn to perform multiple recording of information.

In reproduction of information, the optical path of the information beam 12a is intercepted by the spatial light modulator (SLM) 15 to radiate the recording reference beam 12b alone onto the optical information recording medium. In reproduction of information, control is made to vary the angle of the optical information recording medium so that the same incident angle as that of the recording reference beam 12b in recording of page data to be reproduced will be obtained.

On the opposite side of the optical information recording medium on which the recording reference beam 12b is irradiated appears are production beam which reproduces a Fourier-transform image having a recorded dot pattern. The reproduction beam is guided to the Fourier-transform lens 30b and inversely Fourier transformed to reproduce a dot pattern signal. The dot pattern signal is received by a light receiving element 20 such as a CCD (charge coupled device) and further converted to an electric digital data signal. The digital data signal is then sent to a decoder and original data is reproduced therein.

Optical information recording and reproduction apparatus is known which irradiates an information beam and a reference beam from the same side of an optical information recording medium (Japanese Patent Laid-Open No. 10-0124872/(1998)). The optical information recording and reproduction apparatus irradiates an information beam and a reference beam coaxially onto an optical information recording medium as well as condenses the information beam and the reference beam so that they will be brought into focus on the surface of the reflective layer in the optical information recording medium in order to record and reproduce information. In reproduction of information, the optical information recording and reproduction apparatus irradiates the reference beam onto the optical information recording medium and receives, on a light receiving element such as a CCD, a beam produced by reflection of a reproduction beam generated from the reference beam in order to reproduce the original data.

The optical information recording and reproduction apparatus described in the Japanese Patent Laid-Open No. 2002-123161 comprises an optical system including a light source 11 and a spatial light modulator (SLM) 15 and a light receiving element 20 for receiving a reproduction beam are arranged opposite to each other across an optical information recording medium.

This complicates the optical system of the entire optical information recording and reproduction apparatus, and it has been difficult to scale down the apparatus.

The optical information recording and reproduction apparatus described in the Japanese Patent Laid-Open No. 10-124872/(1998) condenses an information beam and a reference beam so that they will be brought into focus on the surface of the reflective layer in the optical information recording medium in order to record and reproduce information.

Thus, in case the optical information recording medium is moved or changed, it is necessary to condense the information beam and the reference beam again so that they will be brought into focus on the surface of the reflective layer in the optical information recording medium. That is, it is necessary to control the position of each of the optical system and the optical information recording medium to perform re-focusing.

SUMMARY OF THE INVENTION

The invention solves the foregoing problems and aims at providing optical information apparatus, an optical information recording method, optical information reproduction apparatus, an optical information reproduction method and optical information recording and reproduction apparatus which support simplified configuration of the optical system and compact design.

The invention further aims at providing optical information apparatus, an optical information recording method, optical information reproduction apparatus, an optical information reproduction method and optical information recording and reproduction apparatus which does not require re-focusing by way of position control of the optical system and the optical information recording medium each time information recording or reproduction is performed even in case the optical information recording medium is moved or changed.

According to a first aspect of the invention, an optical information recording apparatus comprises: recording reference beam irradiation means for irradiating a recording reference beam onto an optical information recording medium; information beam irradiation means for irradiating an information beam carrying information onto one surface of the optical information recording medium; and reflection means for reflecting the information beam passing through the optical information recording medium onto the optical information recording medium, the reflection means arranged externally to the optical information recording medium and on the other surface opposite to the one surface of the optical information recording medium; in that the optical information recording apparatus records onto the optical information recording medium an interference pattern generated by interference of the recording reference beam irradiated by the recording reference beam irradiation means and the information beam irradiated by the reflection means.

According to a second aspect of the invention, the optical information recording apparatus comprises: a light source for emitting a luminous flux; luminous flux splitting means for splitting a luminous flux emitted from the light source into two luminous fluxes; and information beam generation means for generating an information beam which carries information, the information beam obtained by spatially modulating one luminous flux split by the luminous flux splitting means; in that the recording reference beam irradiation means irradiates, as the recording reference beam, the other luminous flux split by the luminous flux splitting means onto the optical information recording medium.

According to third aspect of the invention, in the optical information recording apparatus, the reflection means reflects the information beam passing through the optical information recording medium onto the optical information recording medium.

According to a fourth aspect of the invention, in the optical information recording, the luminous flux splitting means splits the luminous flux emitted from the light source into two luminous fluxes whose polarization directions differ from each other.

According to a fifth aspect of the invention, the optical information recording apparatus comprises polarization control means for matching the polarization direction of the information beam which has passed the optical information recording medium with that of the recording reference beam between the optical information recording medium and the reflection means.

According to a sixth aspect of the invention, in the optical information recording apparatus, the polarization control means is a quarter-wave plate ($\lambda/4$ plate).

According to a seventh aspect of the invention, in the optical information recording apparatus, the reflection means reflects the information beam onto the same surface of the optical information recording medium onto which the recording reference beam is irradiated.

According to an eighth aspect of the invention, in the optical information recording apparatus, the reflection means reflects the information beam onto a surface of the optical information recording medium different from the surface onto which the recording reference beam is irradiated.

According to a ninth aspect of the invention, in the optical information recording apparatus, the information beam irradiation means irradiates an information beam coaxially with the recording reference beam.

According to a tenth aspect of the invention, an optical information recording apparatus comprises: a light source for emitting a luminous flux; luminous flux splitting means for splitting a luminous flux emitted from the light source into two luminous fluxes whose polarization directions differ from each other; polarization rotation means for matching the polarization direction of one luminous flux split by the luminous flux splitting means with that of the other luminous flux, information beam generation means for generating an information beam which carries information, the information beam obtained by spatially modulating one luminous flux split by the luminous flux splitting means; information beam irradiation means for irradiating the information beam onto one surface of the optical information recording medium; and recording reference beam irradiation means for irradiating, as a recording reference beam, the other luminous flux split by the luminous flux splitting means onto the optical information recording medium; in that the optical information recording apparatus records onto the optical information recording medium an interference pattern generated by interference of the information beam irradiated by the information beam irradiation means and the recording reference beam irradiated by the recording reference beam irradiation means.

According to an eleventh aspect of the invention, in the optical information recording apparatus, the information beam irradiation means irradiates the information beam onto the same surface of the optical information recording medium onto which the recording reference beam is irradiated.

According to a twelfth aspect of the invention, in the optical information recording apparatus, the information beam irradiation means irradiates the information beam onto a surface of the optical information recording medium different from the surface onto which the recording reference beam is irradiated.

According to a thirteenth aspect of the invention, in the optical information recording apparatus, the polarization rotation means is a half-wave plate (λ/2 plate).

According to a fourteenth aspect of the invention, an optical information recording method comprises the steps of: irradiating a recording reference beam onto an optical information recording medium; irradiating onto one surface of the optical information recording medium an information beam carrying information to be recorded onto the optical information recording medium; and recording an interference pattern generated by interference of the information beam and the recording reference beam onto the optical information recording medium by reflecting the information beam passing through the optical information recording medium by way of reflection means arranged externally to the optical information recording medium and on the other surface opposite to the one surface of the optical information recording medium onto which the information beam is irradiated.

A fifteenth aspect of the invention, an optical information reproduction apparatus which uses holography to reflect an information beam irradiated onto one surface of an optical information recording medium and passing through the optical information recording medium by way of refection means arranged externally to the optical information recording medium and irradiate the information beam onto the other surface of the information recording medium, thereby reproducing information from the optical information recording medium on which is recorded an interference pattern generated by interference of the information beam and a recording reference beam, in that the optical information reproduction apparatus comprises: reproduction reference beam irradiation means for irradiating a reproduction reference beam onto the same surface of the optical information recording medium onto which the recording reference beam is irradiated; and a light receiving element for collecting and detecting a reproduction beam generated by irradiating the reproduction reference beam onto the optical information recording medium by way or the reproduction reference beam irradiation means.

According to a sixteenth aspect of the invention, an optical information reproduction apparatus which uses holography to reproduce information from an optical information recording medium on which information is recorded, in that the optical information reproduction apparatus comprises: reproduction reference beam irradiation means for irradiating a reproduction reference beam onto the optical information recording medium; reflection means for reflecting onto the optical information recording medium a reproduction beam generated from the optical information recording medium by irradiating the reproduction reference beam onto the optical information recording medium by way of the reproduction reference beam irradiation means, the reflection means arranged externally to the optical information recording medium; and a light receiving element for collecting and detecting the reproduction beam reflected by the reflection means and passing through the optical information recording medium.

According to a seventeenth aspect of the invention, in the optical information reproduction apparatus, in that the optical information reproduction apparatus comprises polarization control means for deviating the polarization direction of the reproduction beam from that of the reproduction reference beam between the recording medium and the reflection means.

According to an eighteenth aspect of the invention, in the optical information reproduction apparatus, the polarization control means is a quarter-wave plate (quarter-wave plate).

According to a nineteenth aspect of the invention, in the optical information reproduction apparatus, the light receiving element collects and detects the reproduction beam from the same surface on to which the reproduction reference beam is irradiated.

According to a twentieth aspect of the invention, in the optical information reproduction apparatus, the light receiving element collects and detects the reproduction beam from a surface different from that onto which the reproduction reference beam is irradiated.

According to a twenty-first aspect of the invention, in the optical information reproduction apparatus, the reflection means coaxially reflects the reproduction beam.

According to a twenty-second aspect of the invention, an optical information reproduction method which uses holography to reflect an information beam irradiated onto one surface of an optical information recording medium and passing through the optical information recording medium by way of refection means arranged externally to the optical information recording medium and irradiate the information beam onto the other surface of the information recording medium, thereby reproducing information from the optical information recording medium on which is recorded an interference pattern generated by interference of the information beam and a recording reference beam, in that the optical information reproduction method comprises the steps of: irradiating a reproduction reference beam onto the same surface of the optical information recording medium onto which the recording reference beam is irradiated; and collecting and detecting a reproduction beam generated by irradiating the reproduction reference beam onto the optical information recording medium.

According to a twenty-third aspect of the invention, an optical information reproduction method which uses holography to reproduce information from an optical information recording medium on which information is recorded, in that the optical information reproduction method comprises the steps of: irradiating a reproduction reference bean onto the optical information recording medium; and reflecting onto the optical information recording medium a reproduction beam generated from the optical information recording medium by irradiating the reproduction reference beam onto the optical information recording medium, the reflection means arranged externally to the optical information recording medium as well as collecting and detecting the reproduction beam passing through the optical information recording medium.

According to a twenty-fourth aspect of the invention, an optical information recording and reproduction apparatus which uses holography to record information on to an optical information recording medium onto which information is recorded as well as reproduce information from the optical information recording medium, in that the optical information recording and reproduction apparatus comprises: recording reference beam irradiation means for irradiating a recording reference beam onto the optical information recording medium; reproduction reference beam irradiation means for irradiating a reproduction reference beam onto the optical information recording medium; information beam irradiation means for irradiating onto one surface of the optical information recording medium an information beam carrying information to be recorded onto the optical information recording medium; reflection means for reflecting the information beam passing through the optical information recording medium onto the optical information recording medium, the reflection means arranged externally to the optical information recording medium and on the other surface opposite to the one surface of the optical information recording medium; and a light receiving element for collecting and detecting a reproduction beam generated by irradiating the reproduction reference bean onto the optical information recording medium by way of the reproduction reference beam irradiation means.

BRIEF DESCRIPTION OF THE DRAWINGS

FIG. 14 is an enlarged view of an optical information recording medium and reflection apparatus which illustrates operation of recording in the fifth embodiment;

FIG. 15 is an enlarged view of the optical information recording medium and the reflection apparatus which illustrates operation of reproduction in the fifth embodiment;

FIG. 16 is another enlarged view of the optical information recording medium and the reflection apparatus which illustrates operation of recording in the fifth embodiment;

FIG. 17 is another enlarged view of the optical information recording medium and the reflection apparatus which illustrates operation of reproduction in the fifth embodiment;

FIG. 19 is an enlarged view of an optical information recording medium and reflection apparatus which illustrate operation of recording in the sixth embodiment;

FIG. 20 is another enlarged view of the optical information recording medium and the reflection apparatus which illustrate operation of recording in the sixth embodiment;

FIG. 21 is an enlarged view of the optical information recording medium and the reflection apparatus which illustrate operation of reproduction in the sixth embodiment;

FIG. 22 is another enlarged view of the optical information recording medium and the reflection apparatus which illustrate operation of reproduction in the sixth embodiment;

DETAILED DESCRIPTION OF THE PREFERRED EMBODIMENTS

Embodiments of the invention are described below referring to FIGS. 1 through 25.

First Embodiment

Figure 1:
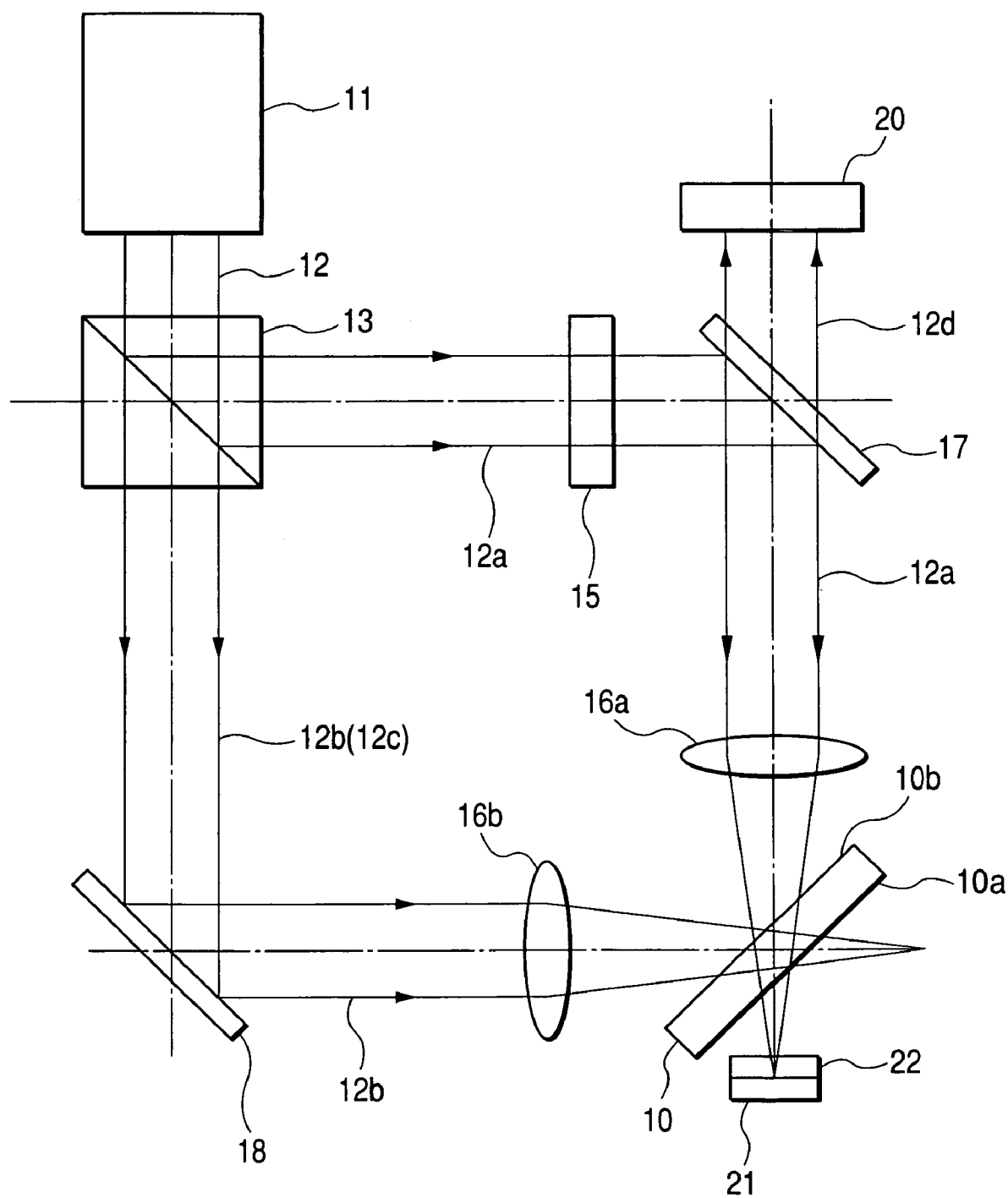
FIG. 1 is a schematic view of the configuration of optical information recording apparatus and optical information reproduction apparatus according to the first embodiment of the invention.
Figure 2:
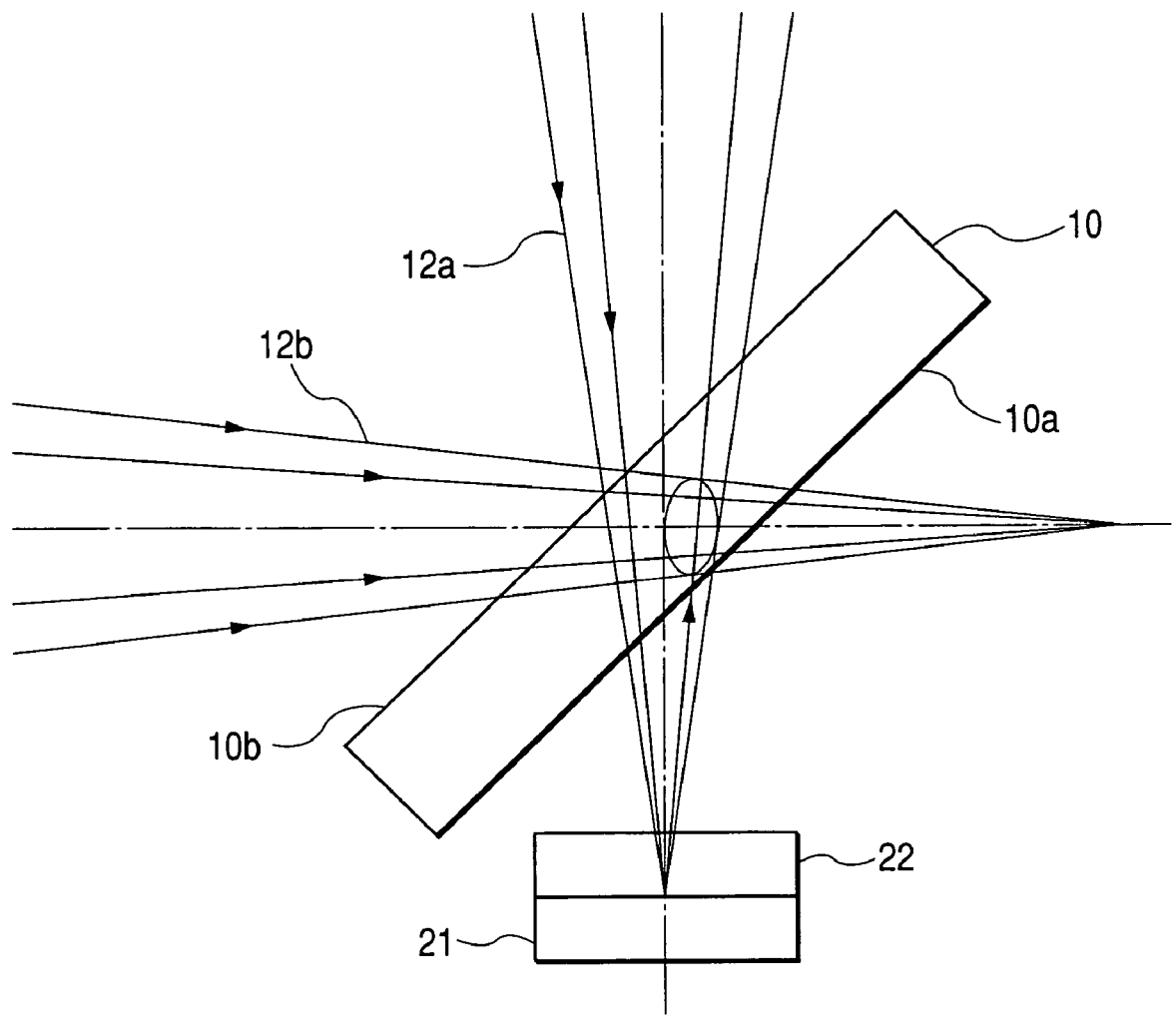
FIG. 2 is an enlarged view of an optical information recording medium and reflection apparatus which illustrates operation of recording in the first embodiment.
Figure 3:
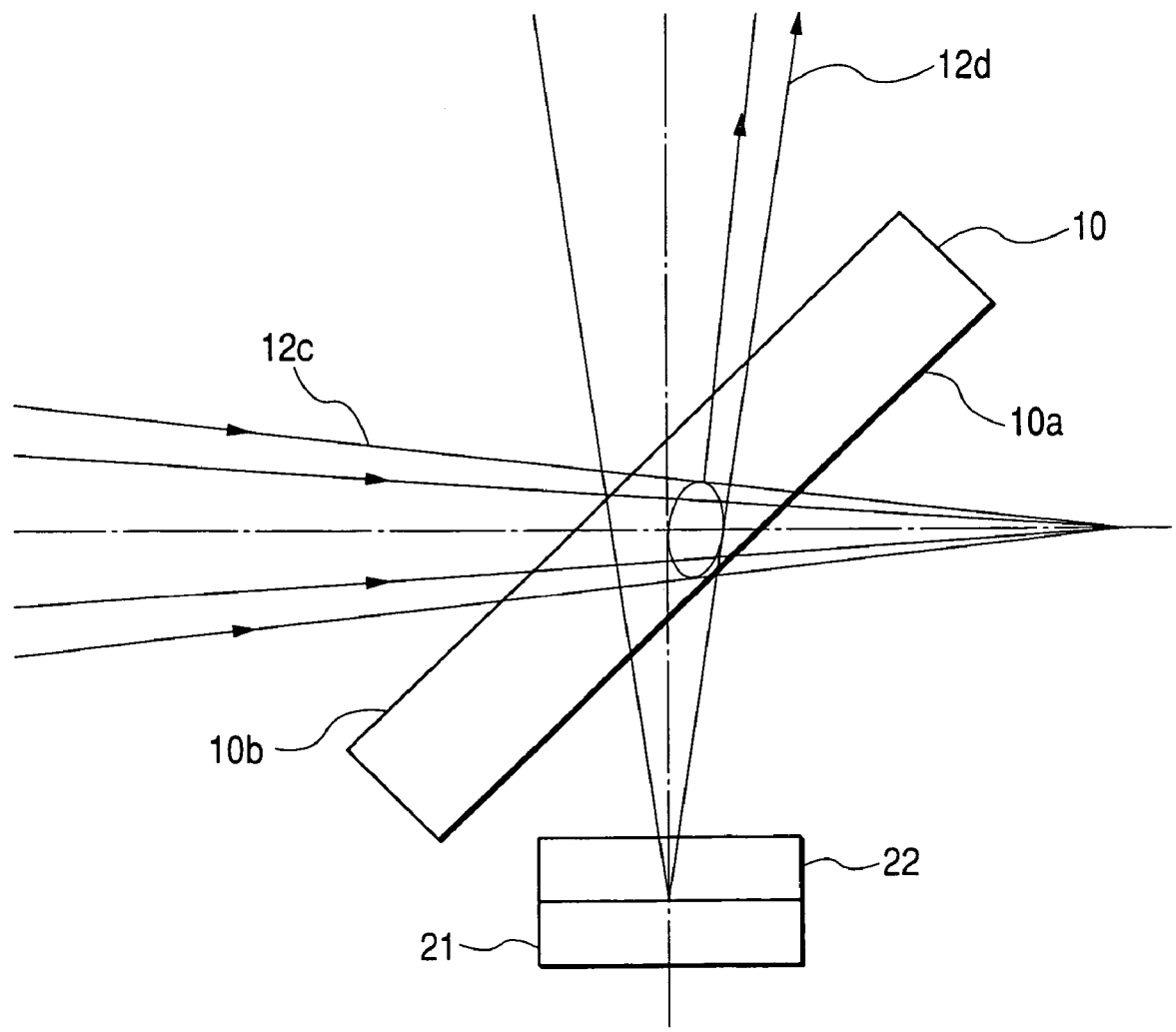
FIG. 3 is an enlarged view of the optical information recording medium and the reflection apparatus which illustrates operation of reproduction in the first embodiment.

Optical information recording apparatus and optical information reproduction apparatus according to the first embodiment of the invention are described below referring to FIGS. 1 through 3. FIG. 1 is a schematic view of the configuration of optical information recording apparatus and optical information reproduction apparatus according to the first embodiment. FIG. 2 is an enlarged view of an optical information recording medium and reflection apparatus which illustrates operation of recording. FIG. 3 is an enlarged view of the optical information recording medium and the reflection apparatus which illustrates operation of reproduction.

Configuration of the optical information recording apparatus and the optical information reproduction apparatus according to the first embodiment of the invention is described below referring to FIG. 1. As shown in FIG. 1, the optical information recording and reproduction apparatus of the first embodiment comprises a light source 11, a polarization beam splitter (PBS) 13, a spatial light modulator (SLM) 15, objective lenses 16a and 16b, a half mirror 17, a mirror 18, a light receiving element 20, reflection apparatus 21, and a polarization controller 22.

A recording reference beam 12b is incident on one surface 10b of an optical information recording medium by way of recording reference beam irradiation means comprising a mirror 18 and an objective lens 16b. The information beam 12a is temporarily incident on the same surface 10b of the optical information recording medium on which the recording reference beam 12b is incident by way of information beam irradiation means comprising a half mirror 17 and an objective lens 16a, passes through the optical information recording medium and is reflected by reflection apparatus 21, and is incident on the surface 10a of the optical information recording medium again.

The reflection apparatus 21 works as the "reflection means" of the invention. The spatial light modulator (SLM) 15 works as the "information beam generation means" of the invention. The polarization beam splitter (PBS) 13 works as the "luminous splitting means" of the invention.

A luminous flux 12 emitted from the light source 11 is split by a polarization beam splitter (PBS) 13 into two luminous fluxes, an information beam 12a and a 12b.

The reflection apparatus 21 is arranged on the other side of an optical system comprising a light source 11, a polarization beam splitter (PBS) 13, and objective lenses 16a, 16b across the optical information recording medium. The polarization controller 22 is arranged between the optical information recording medium and the reflection apparatus 21. While the polarization controller 22 is provided on the surface of the reflection apparatus 21 in this embodiment, the polarization controller 22 may be arranged on the optical information recording medium instead as long as it is arranged between the optical information recording medium and the reflection apparatus 21. The light receiving element 20 is arranged on the same side as the optical system comprising a light source 11, a polarization beam splitter (PBS) 13, and objective lenses 16a, 16b.

Operation of the optical information recording and reproduction apparatus according to this embodiment is described below separately for recording and reproduction of information.

Operation of recording is described below referring to FIGS. 1 and 2. The light source 11 is a YAG laser having the wavelength of 532 nm or He—Ne laser having the wavelength of 632.8 nm in order to generate an information beam and a recording (reproduction) reference beam. The polarization beam splitter (PBS) 13 receives a luminous flux 12 and splits the luminous flux 12 into an information beam 12a and a recording reference beam 12b. The information beam 12a and the recording reference beam 12b are irradiated onto the optical information recording medium on separate optical paths.

As shown in FIG. 1, the luminous flux 12 emitted from the light source 11 is split by a polarization beam splitter (PBS) 13 into two luminous fluxes, an information beam 12a and a recording reference beam 12b. In this process, the polarization beam splitter (PBS) 13 transmits the P-polarization component of the incident beam and reflects the S-polarization component in the direction perpendicular to the incident beam. Thus, the polarization direction of the information beam 12a is the S-polarization direction while the polarization direction of the recording reference beam 12b is the P-polarization direction.

On the optical path of the information beam 12a as S-polarization are arranged a polarization beam splitter (PBS) 13, a spatial light modulator (SLM) 15, a half mirror 17, an objective lens 16a, an optical information recording medium, a polarization controller 22 and reflection apparatus 21 in this order. The reflection apparatus 21 is arranged in orthogonal direction to the optical axis of the information beam 12a so that the information beam 12a condensed by the objective lens 16a will be irradiated normal to a reflective surface.

The information beam 12a is modulated based on recorded data by the spatial light modulator (SLM) 15. The information beam 12a is reflected by the half mirror 17, condensed by the objective lens 16a, and temporarily incident on the surface 10b of the optical information recording medium. The information beam 12a then passes through the optical information recording medium, is reflected by the reflection apparatus 21 and incident on the surface 10a of the optical information recording medium again.

The spatial light modulator (SLM) 15 comprises a transmission TFT liquid crystal display (LCD) panel where a great number of pixels are arranged in the shape of a grating. When recorded data converted to a signal is input as an electric signal, the light-transmission or light-interception state is selected per pixel to form a pattern of a matrix including light and dark dots on a two-dimensional plane. In this way, by spatially modulating the luminous flux split by the polarization beam splitter (PBS) 13 by way of the spatial light modulator (SLM) 15, an information beam carrying information is generated. The half mirror 17 reflects the information beam 12a which has passed through the spatial light modulator (SLM) 15 onto the objective lens 16a.

The information beam 12a passes through the optical information recording medium and polarization-controlled by the polarization controller 22 and condensed by the objective lens 16a to be focused on the reflective surface of the reflection apparatus 21. The reflection apparatus 21 is a total reflection mirror formed with a metal film such as an aluminum layer or dielectric multilayer. The polarization controller 22 may be a quarter-wave (quarter-wave) plate which converts a linear polarization to circular polarization.

When a light of S-polarization passes through the quarter-wave plate, the quarter-wave plate converts it to circular or elliptical polarization. The information beam 12a converter to circular or elliptical polarization is reflected by the reflection apparatus 21 in reverse direction and passes through the quarter-wave plate again. In this practice, the information beam 12a is converted to linear polarization again. In case the vibration direction of the S-polarization luminous flux is previously set at an angle of 45 degrees with respect to the optic axis of the quarter-wave plate, the vibration direction of the information beam 12a in linear polarization rotates by 90 degrees from the S-polarization and becomes P-polarization.

On the optical path of the recording reference beam 12b as P-polarization are arranged a polarization beam splitter (PBS) 13, a mirror 18, an objective lens 16b and an optical information recording medium in this order. The recording reference beam 12b is reflected by the mirror 18, condensed by the objective lens 16a, and incident on the surface 10b of the optical information recording medium. The objective lens 16a condenses the recording reference beam 12b so that the recording reference beam 12b will be focused at a point off the optical information recording medium which is opposite the objective lens 16b.

The state of each of the information beam 12a and the recording reference beam 12b in the optical information recording medium is described below referring to FIG. 2. The information beam 12a and the recording reference beam 12b are incident on the optical information recording medium via separate optical paths. The recording reference beam 12b is incident on one surface 10b of the optical information recording medium and the information beam 12a is temporarily incident on the same surface 10b of the optical information recording medium on which the recording reference beam 12b is incident and passes through the optical information recording medium. The information beam 12a is S-polarization and the recording reference beam 12b is P-polarization. The polarization directions differ by 90 degrees so that both beams do not interfere with each other.

The information beam 12a which has passed through the optical information recording medium is reflected by the reflection apparatus 21 and incident on the surface 10a of the optical information recording medium again. The information beam 12a is incident normal to the reflective surface of the reflection apparatus 21 and is reflected. Thus, the optical path of the information beam 12a incident on the reflection apparatus 21 matches that of the information beam 12a reflected by the reflection apparatus 21. Control is made so that the information beam 12a will make a round trip from the optical information recording medium to a polarization controller 22 arranged between the optical information recording medium and the reflection apparatus 21 and the polarization direction will change from S-polarization direction to P-polarization direction.

The information beam 12a as P-polarization incident on the surface 10a of the optical information recording medium 10 again interferes with the recording reference beam 12b as P-polarization incident on the surface 10b inside the optical information recording medium to form an interference pattern (reflection hologram). The optical information recording medium records the interference pattern.

The optical information recording medium is composed of a hologram material whose optical characteristics such as refractive index, dielectric constant and reflection factor vary with the intensity of light irradiation. Such hologram materials include photorefractive crystals such as $LiNbO_3$ and $BaTiO_3$ and a photopolymer. The optical information recording medium 10 may include a transparent base or protective film which is not shown.

In case angular-multiplexed recording is performed, a movable stage (not shown) on which an optical information recording medium is attached is rotated and moved to change the relative angles between the information beam 12a and the optical information recording medium and the recording reference beam 12b and the optical information recording medium. In this way, when recording of information on the first page is complete, the movable stage is rotated for a predetermined amount and the information on the second page is recorded. By sequentially repeating information recording, angular-multiplexed recording is performed.

Operation of reproduction is described below referring to FIGS. 1 and 3. As shown in FIG. 1, in reproduction of information, all the pixels in the spatial light modulator (SLM) 15 are controlled so that they will intercept light, in this case the information beam 12a. A reproduction reference beam 12c as P-polarization split by the polarization beam splitter (PBS) 13 is incident on the surface 10b of the optical information recording medium via the same optical path as the recording reference beam 12b.

The state of the reproduction reference beam 12c in the optical information recording medium is described below referring to FIG. 3. The reproduction reference beam 12c is incident on the surface 10b of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10b of the optical information recording medium on which the reproduction reference beam 12c is incident, passes through the objective lens 16a and the half mirror 17, and is incident on the light receiving element 20. The light receiving element 20 converts the dot-matrix pattern signal contained in the received reproduction beam 12d to an electric digital data signal. The original data is then reproduced by a decoder (not shown).

In case the information recorded by way of angular multiplexing is to be reproduced, the movable stage (not shown) on which an optical information recording medium is attached is rotated and moved to change the relative angle between the reproduction reference beam 12c and the optical information recording medium, same as the recording process. In this way, by sequentially repeating reproduction of information on each page, information recorded by way of angular multiplexing is reproduced.

With the optical system configured as mentioned above, it is possible to condense the information beam 12a so that it will be focused on the reflective surface of the reflection apparatus 21 as well as match the optical path of the information beam 12a before it is reflected by the reflection apparatus 21 with that after it is reflected by the reflection apparatus 21. As a result, the information beam 12a is condensed so that it will be surely focused on the reflective surface of the reflection apparatus 21 even in case the optical information recording medium is moved or changed. This eliminates the need for re-focusing by controlling the position of the optical system and/or optical information recording medium each time recording or reproduction of information is performed. By arranging the reflection apparatus 21, it is possible to arrange an optical system comprising a light source 11, a polarization beam splitter (PBS) 13, objective lenses 16a, 16b, and a light receiving element 20 on one side only with respect to the optical information recording medium. This simplifies the configuration of the optical system and provides a more compact apparatus design than in the related art.

Second Embodiment

Figure 4:
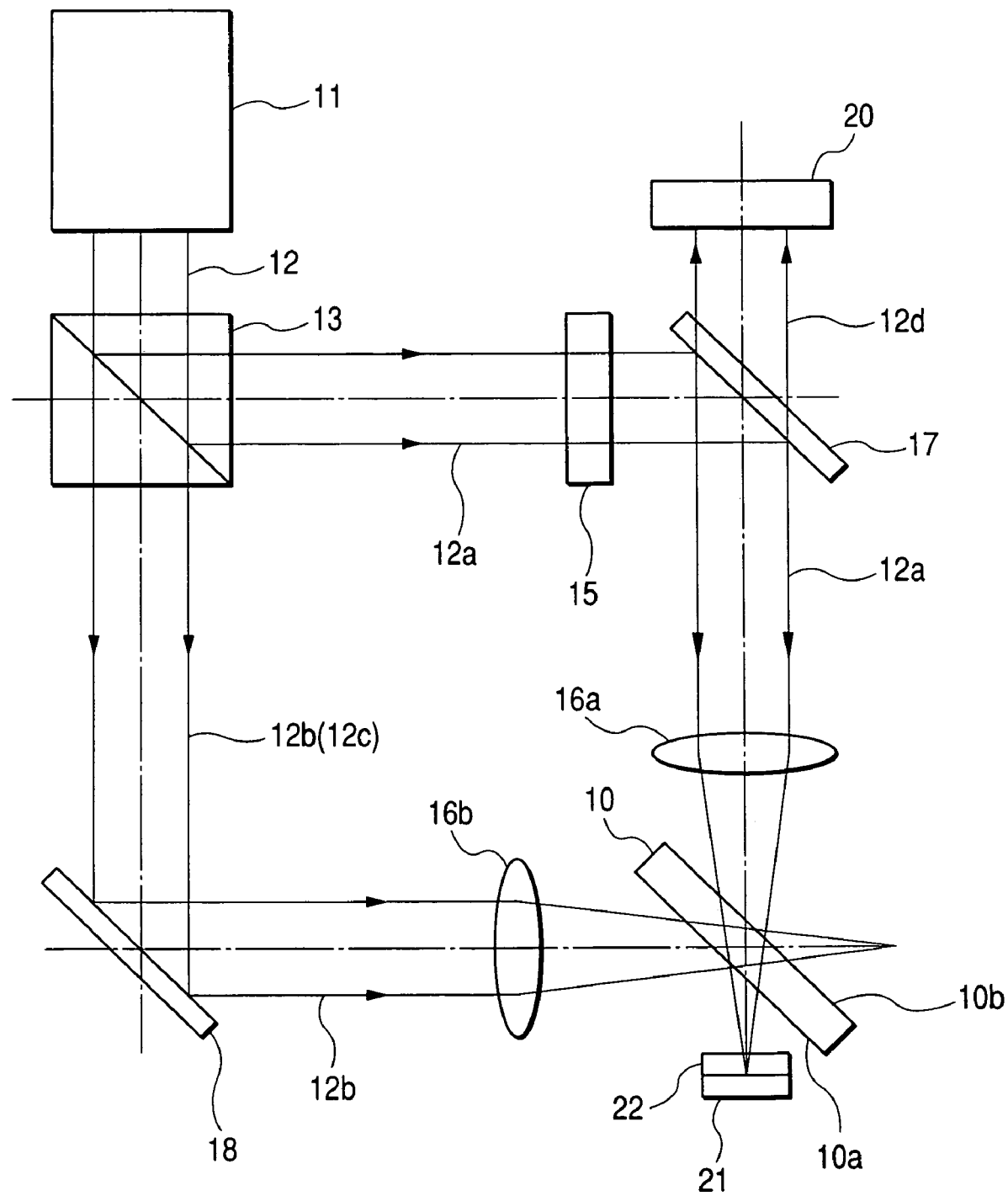
FIG. 4 is a schematic view of the configuration of optical information recording apparatus and optical information reproduction apparatus according to the second embodiment of the invention.
Figure 5:
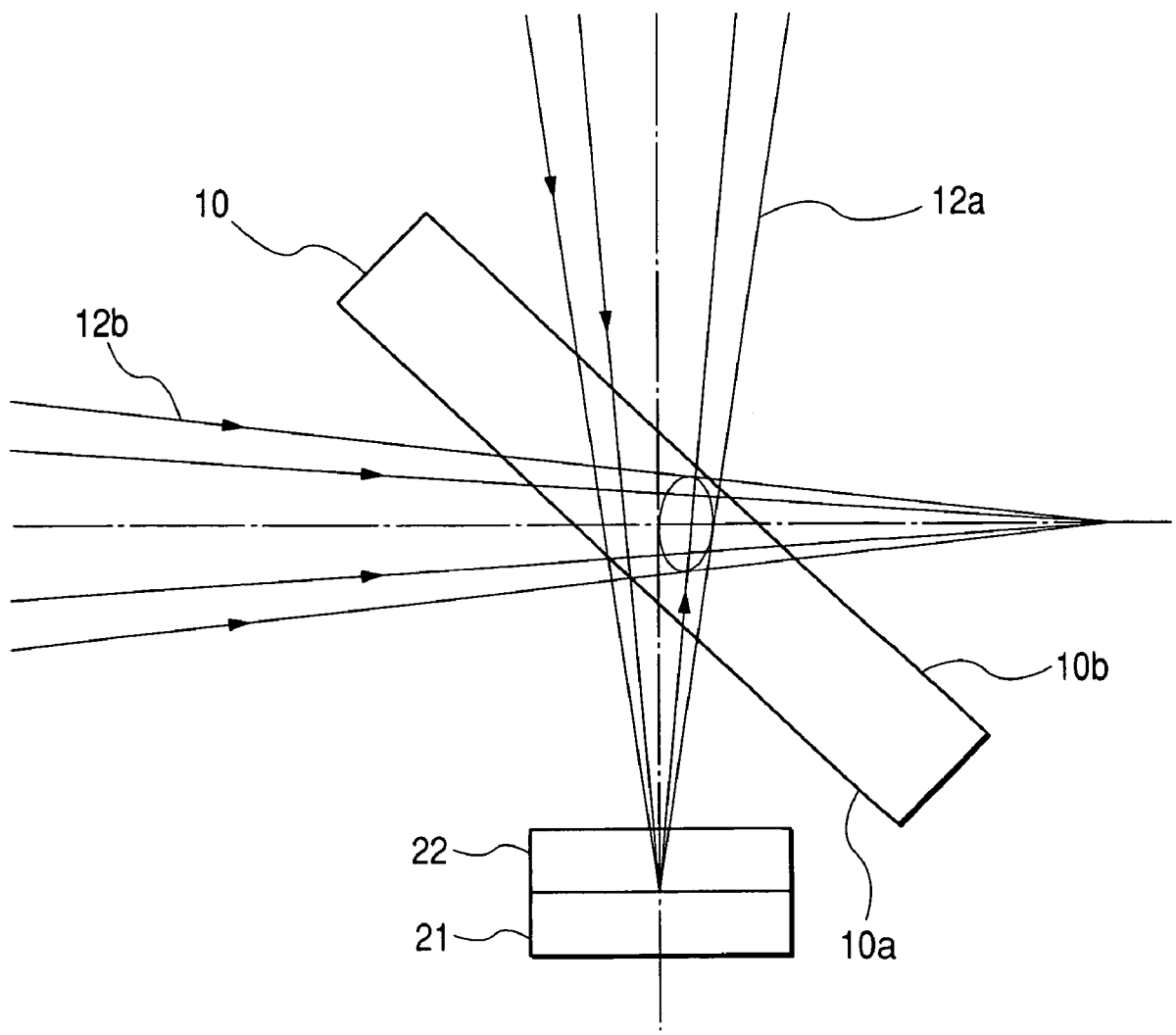
FIG. 5 is an enlarged view of an optical information recording medium and reflection apparatus which illustrates operation of recording in the second embodiment.
Figure 6:
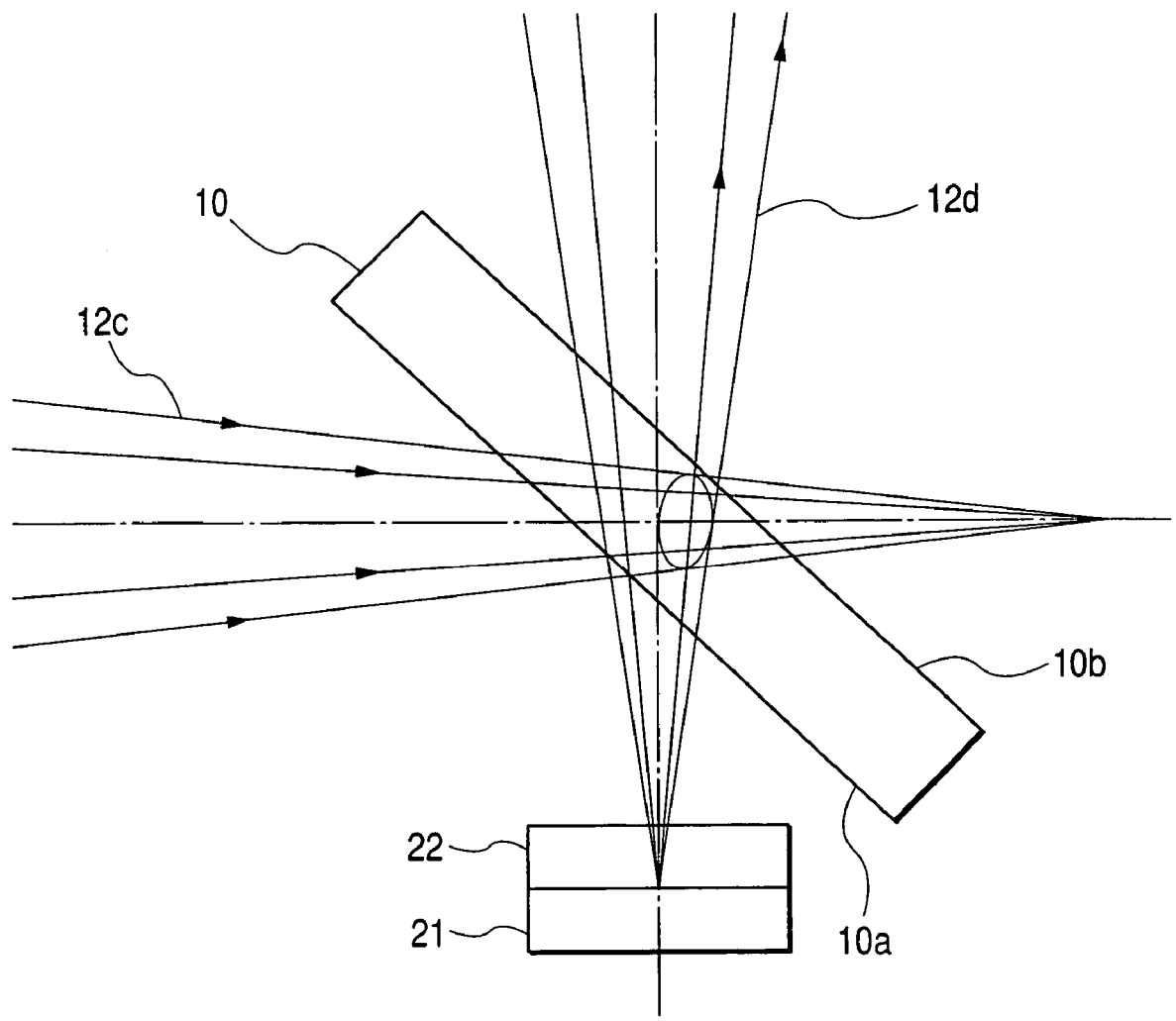
FIG. 6 is an enlarged view of the optical information recording medium and the reflection apparatus which illustrates operation of reproduction in the second embodiment.

Optical information recording apparatus and optical information reproduction apparatus according to the second embodiment of the invention are described below referring to FIGS. 4 through 6. FIG. 4 is a schematic view of the configuration of optical information recording apparatus and optical information reproduction apparatus according to the second embodiment. FIG. 5 is an enlarged view of an optical information recording medium and reflection apparatus which illustrates operation of recording. FIG. 6 is an enlarged view of the optical information recording medium and the reflection apparatus which illustrates operation of reproduction.

Configuration of the optical information recording apparatus and the optical information reproduction apparatus according to the second embodiment of the invention is described below referring to FIG. 4. As shown in FIG. 4, the optical information recording and reproduction apparatus of the second embodiment comprises the same optical system as the optical information recording and reproduction apparatus of the first embodiment. The optical information recording medium of the first embodiment is arranged at an angle of 90 degrees with respect to the optical system. The recording reference beam 12b is incident on one surface 10a of the optical information recording medium by way of recording reference beam irradiation means comprising a mirror 18 and an objective lens 16b. The information beam 12a is temporarily incident on the surface 10b of the optical information recording medium different from the surface 10a on which the recording reference beam 12b is incident, by way of the information beam irradiation means comprising a half mirror 17 and an objective lens 16a, passes through the optical information recording medium, is reflected by the reflection apparatus 21, and is incident on the surface 10a of the optical information recording medium.

Operation of the optical information recording and reproduction apparatus according to this embodiment is described below separately for recording and reproduction of information.

Operation of recording is described below referring to FIGS. 4 and 5. As shown in FIG. 4, a luminous flux 12 emitted from the light source 11 is split by a polarization beam splitter (PBS) 13 into two luminous fluxes, an information beam 12a and a 12b. The polarization direction of the information beam 12a is the S-polarization direction while the polarization direction of the recording reference beam 12b is the P-polarization direction.

The information beam 12a is modulated based on recorded data by the spatial light modulator (SLM) 15. The information beam 12a is reflected by the half mirror 17, condensed by the objective lens 16a, and temporarily incident on the surface 10b of the optical information recording medium. The information beam 12a then passes through the optical information recording medium, is reflected by the reflection apparatus 21 and incident on the surface 10a of the optical information recording medium again. The recording reference beam 12b is reflected by the mirror 18, condensed by the objective lens 16b, and incident on the surface 10a of the optical information recording medium.

The state of each of the information beam 12a and the recording reference beam 12b in the optical information recording medium is described below referring to FIG. 5. The information beam 12a and the recording reference beam 12b are incident on the optical information recording medium via separate optical paths. The recording reference beam 12b is incident on one surface 10a of the optical information recording medium and the information beam 12a is temporarily incident on the surface 10b of the optical information recording medium different from the surface 10a on which the information beam 12a is incident, and passes through the optical information recording medium. The information beam 12a is S-polarization and the recording reference beam 12b is P-polarization and the polarization directions differ by 90 degrees so that both beams do not interfere with each other.

The information beam 12a which has passed through the optical information recording medium is condensed by the objective lens 16a so that it will be focused on the reflective surface of the reflection apparatus 21. The information beam 12a is reflected coaxially by the reflection apparatus 21 and is incident on the surface 10a of the optical information recording medium again. Control is made so that the information beam 12a will make a round trip from the optical information recording medium to a polarization controller 22 arranged between the optical information recording medium and the reflection apparatus 21 and the polarization direction will change from S-polarization direction to P-polarization direction. The information beam 12a as P-polarization incident on the surface 10a of the optical information recording medium again interferes with the recording reference beam 12b as P-polarization incident on the surface 10a inside the optical information recording medium to form an interference pattern (transmission hologram). The optical information recording medium records the interference pattern.

Operation of reproduction is described below referring to FIGS. 4 and 6. As shown in FIG. 4, in reproduction of information, all the pixels in the spatial light modulator (SLM) 15 are controlled so that they will intercept light, in this case the information beam 12a. The reproduction reference beam 12c as P-polarization split by the polarization beam splitter (PBS) 13 is incident on the surface 10a of the optical information recording medium via the same optical path as the recording reference beam 12b.

The state of the reproduction reference beam 12c in the optical information recording medium is described below referring to FIG. 6. The reproduction reference beam 12c is incident on the surface 10a of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10b of the optical information recording medium different from the surface 10a on which the reproduction reference beam 12c is incident, passes through the objective lens 16a and the half mirror 17, and is incident on the light receiving element 20. The original data is then reproduced.

The optical system configured as mentioned above eliminates the need for re-focusing by controlling the position of the optical system and/or optical information recording medium each time recording or reproduction of information is performed, even in case the optical information recording medium is moved or changed. This simplifies the configuration of the optical system and provides a more compact apparatus design than in the related art.

Third Embodiment

Figure 7:
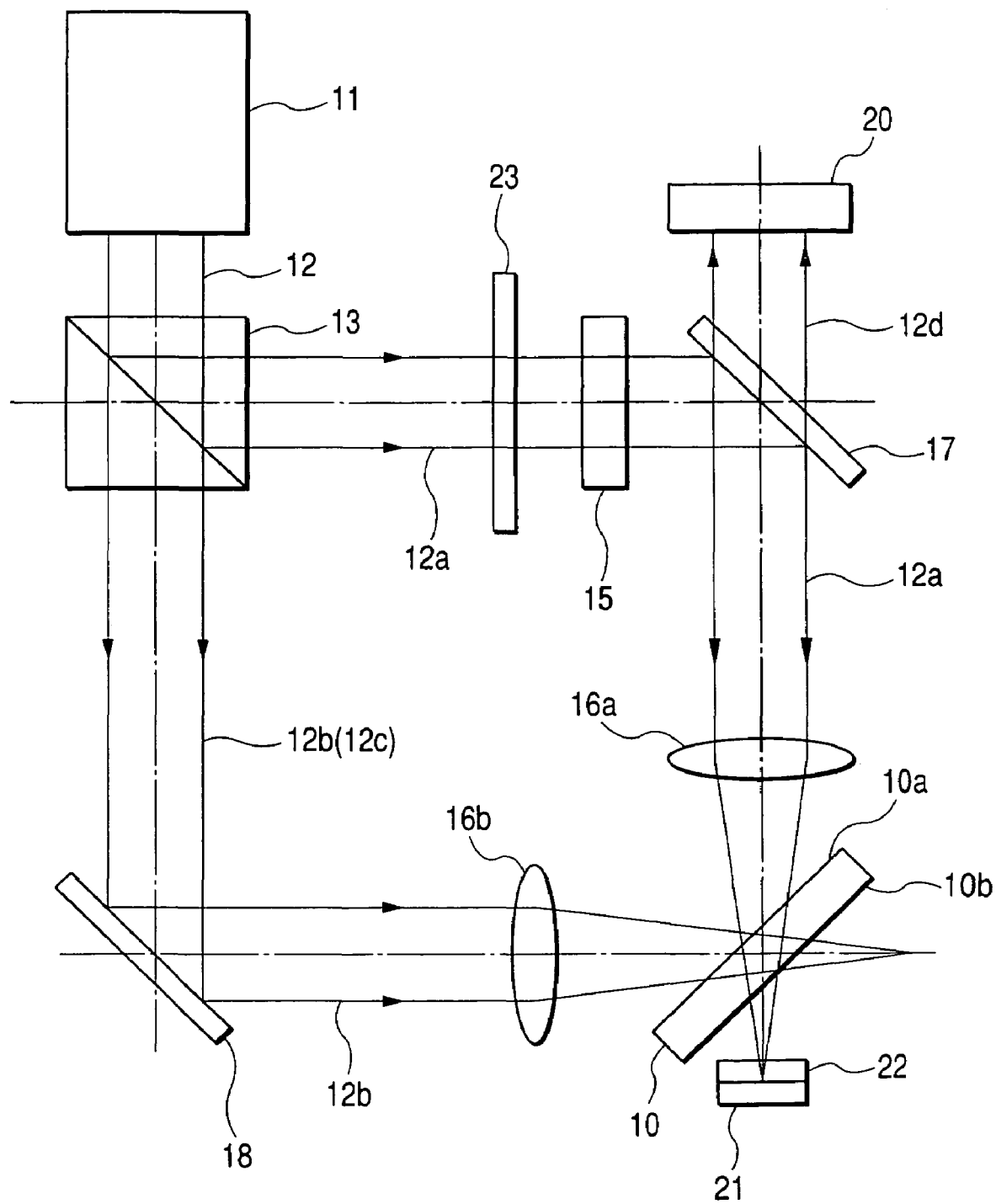
FIG. 7 is a schematic view of the configuration of optical information recording apparatus and optical information reproduction apparatus according to the third embodiment of the invention.
Figure 8:
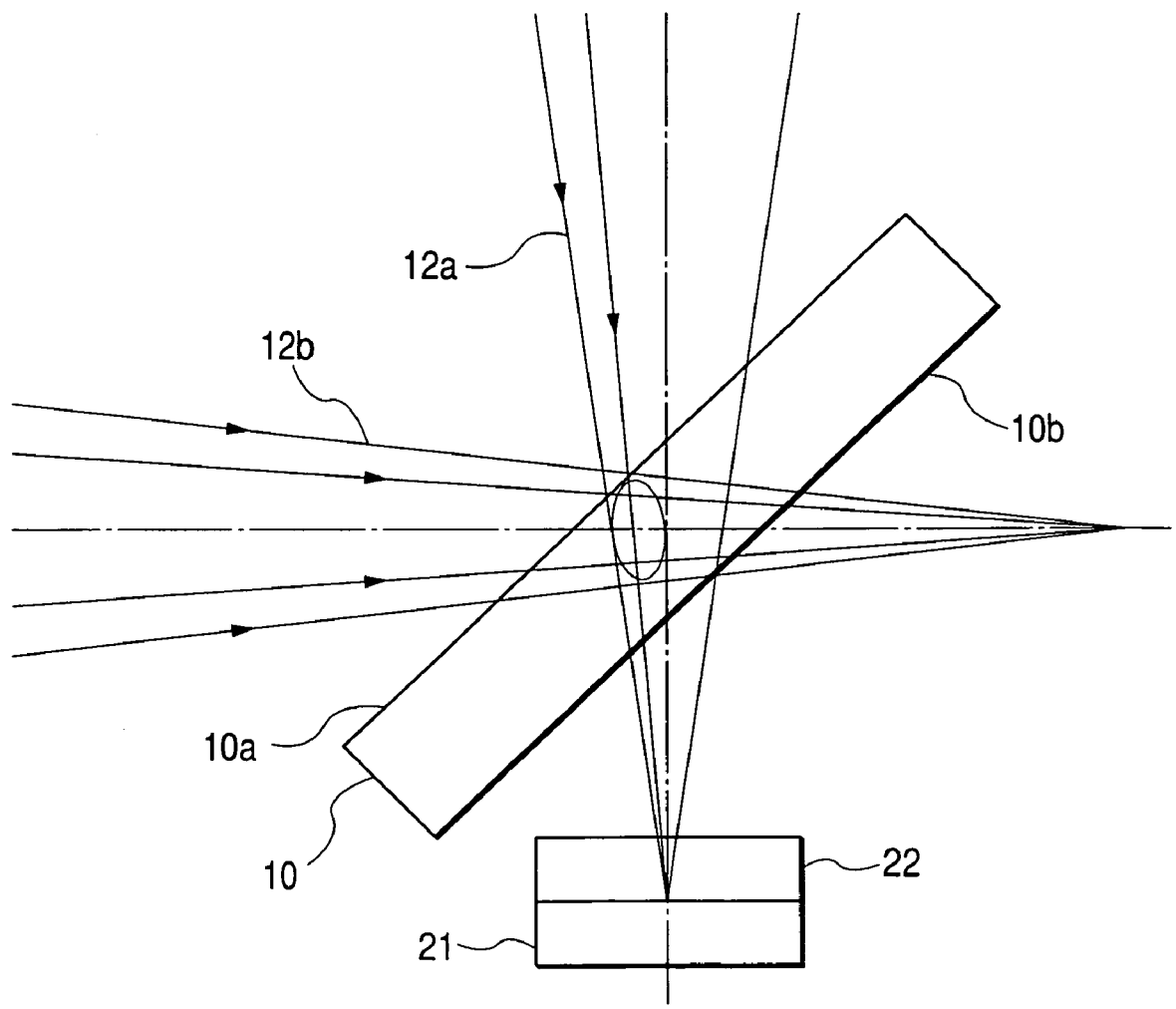
FIG. 8 is an enlarged view of an optical information recording medium and reflection apparatus which illustrates operation of recording in the third embodiment.
Figure 9:
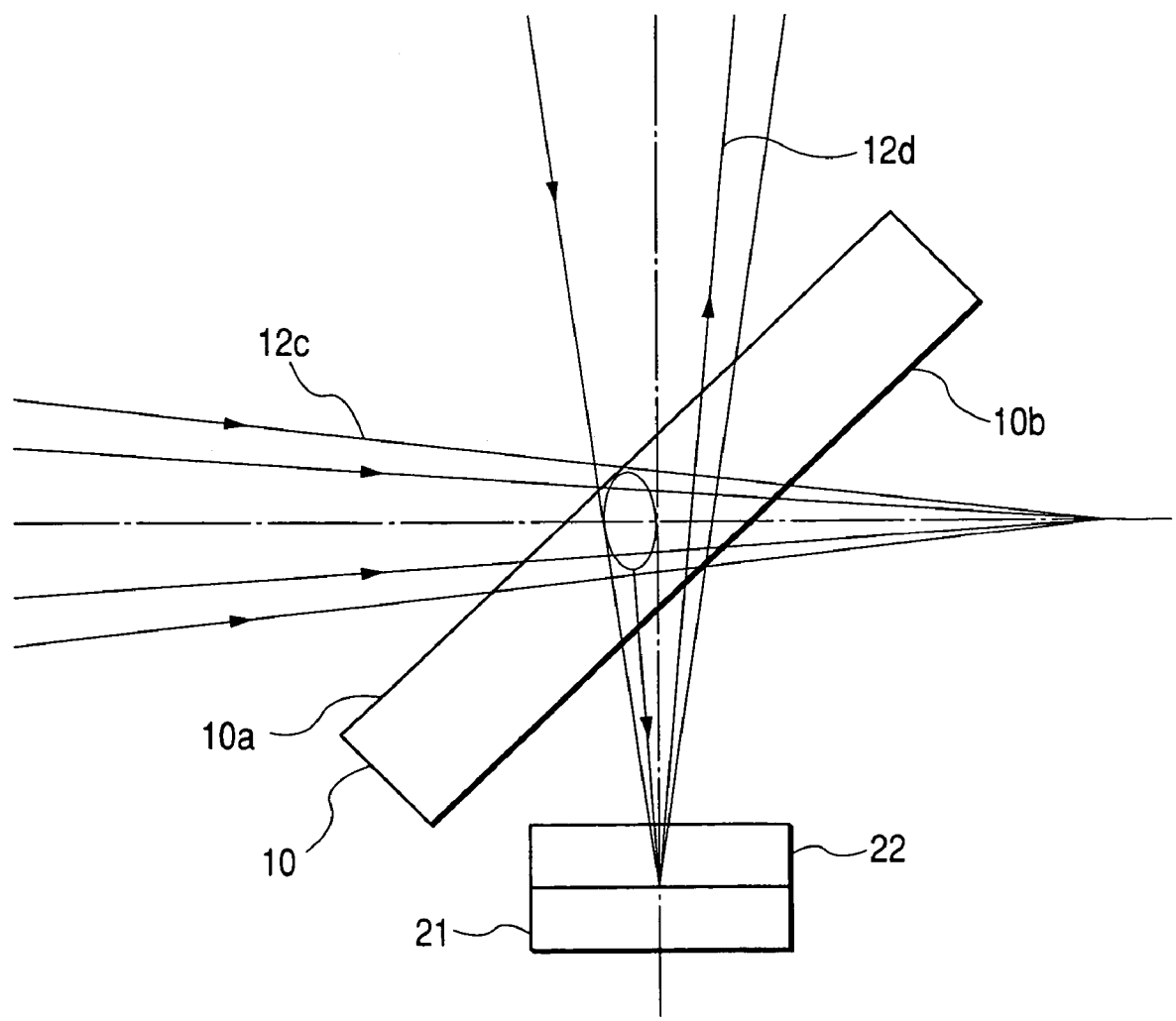
FIG. 9 is an enlarged view of the optical information recording medium and the reflection apparatus which illustrates operation of reproduction in the third embodiment.

Optical information recording apparatus and optical information reproduction apparatus according to the third embodiment of the invention are described below referring to FIGS. 7 through 9. FIG. 7 is a schematic view of the configuration of optical information recording apparatus and optical information reproduction apparatus according to the third embodiment. FIG. 8 is an enlarged view of an optical information recording medium and reflection apparatus which illustrates operation of recording. FIG. 9 is an enlarged view of the optical information recording medium and the reflection apparatus which illustrates operation of reproduction.

Configuration of the optical information recording apparatus and the optical information reproduction apparatus according to the third embodiment of the invention is described below referring to FIG. 7. As shown in FIG. 7, the optical information recording and reproduction apparatus of the third embodiment comprises nearly the same optical system as the optical information recording and reproduction apparatus of the first embodiment. The optical information recording medium is arranged in a similar fashion. This embodiment differs from the first embodiment in that polarization rotation apparatus 23 is arranged on the optical path of the information beam 12a. While the polarization rotation apparatus 23 is arranged between the spatial light modulator (SLM) 15 and the spatial light modulator (SLM) 15 in FIG. 7, the invention is not limited thereto and the polarization rotation apparatus 23 may be arranged anywhere on the optical path of the information beam 12a.

Operation of the optical information recording and reproduction apparatus according to this embodiment is described below separately for recording and reproduction of information.

Operation of recording is described below referring to FIGS. 7 and 8. As shown in FIG. 7, a luminous flux 12 emitted from the light source 11 is split by a polarization beam splitter (PBS) 13 into two luminous fluxes, an information beam 12a and a 12b. The polarization direction of the information beam 12a is the S-polarization direction while the polarization direction of the recording reference beam 12b is the P-polarization direction.

The information beam 12a as S-polarization is incident on the polarization rotation apparatus 23. The polarization rotation apparatus 23 maybe for example a half-wave plate. The half-wave plate rotates the vibration direction of the incident linearly polarized luminous flux by 90 degrees. Thus, the information beam 12a incident on the polarization rotation apparatus 23 is converted to P-polarization. The information beam 12a is then modulated based on recorded data by the spatial light modulator (SLM) 15. The information beam 12a is reflected by the half mirror 17, condensed by the objective lens 16a, and incident on the surface 10a of the optical information recording medium.

The recording reference beam 12b is reflected by the mirror 18, condensed by the objective lens 16b, and incident on the surface 10a of the optical information recording medium.

The state of each of the information beam 12a and the recording reference beam 12b in the optical information recording medium is described below referring to FIG. 8. The information beam 12a and the recording reference beam 12b are incident on the optical information recording medium via separate optical paths. The recording reference beam 12b is incident on one surface 10a of the optical information recording medium and the information beam 12a is incident on the same surface 10a on which the recording reference beam 12b is incident. In this practice, the information beam 12a is condensed by the objective lens 16a so that it will be focused on the reflective surface of the reflection apparatus 21. Both of the information beam 12a and the recording reference beam 12b are P-polarization so that they interfere with each other inside the optical information recording medium to form an interference pattern (transmission hologram). The optical information recording medium records the interference pattern.

Operation of reproduction is described below referring to FIGS. 7 and 9. As shown in FIG. 7, in reproduction of information, all the pixels in the spatial light modulator (SLM) 15 are controlled so that they Will intercept light, in this case the information beam 12a. The reproduction reference beam 12c as P-polarization split by the polarization beam splitter (PBS) 13 is incident on the surface 10a of the optical information recording medium via the same optical path as the recording reference beam 12b.

The state of the reproduction reference beam 12c in the optical information recording medium is described below referring to FIG. 9. The reproduction reference beam 12c is incident on the surface 10a of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10b of the optical information recording medium and condensed so that it will be focused on the reflective surface of the reflection apparatus 21. The reproduction beam 12d is then reflected coaxially by the reflection apparatus 21, is incident on the surface 10b of the optical information recording medium again, and passes through the optical information recording medium. Control is made so that the reproduction beam 12d will make a round trip from the optical information recording medium to a polarization controller 22 arranged between the optical information recording medium and the reflection apparatus 21 and the polarization direction will change from P-polarization direction to S-polarization direction. The reproduction beam 12d incident on the surface 10b of the optical information recording medium again is S-polarization and the reproduction reference beam 12c is P-polarization. The polarization directions differ by 90 degrees so that both beams do not interfere with each other. The reproduction beam 12d passes through the objective lens 16a and the half mirror 17, and is incident on the light receiving element 20. The original data is then reproduced.

While the polarization rotation apparatus is arranged on the optical path of the information beam 12a in this embodiment, the invention is not limited thereto and the polarization rotation apparatus 23 may be arranged on the optical path of the recording reference beam 12b.

With the optical system configured as mentioned above, the information beam 12a is condensed so that it will be surely focused on the reflective surface of the reflection apparatus 21 and the optical path of the reproduction beam 12d reflected by the reflection apparatus 21 is kept constant. This eliminates the need for re-focusing by controlling the position of the optical system and/or optical information recording medium each time recording or reproduction of information is performed, even in case the optical information recording medium is moved or changed. By arranging the reflection apparatus 21, it is possible to arrange an optical system comprising a light source 11, a polarization beam splitter (PBS) 13, objective lenses 16a, 16b, and a light receiving element 20 on one side only with respect to the optical information recording medium. This simplifies the configuration of the optical system and provides a more compact apparatus design than in the related art.

Fourth Embodiment

Figure 10:
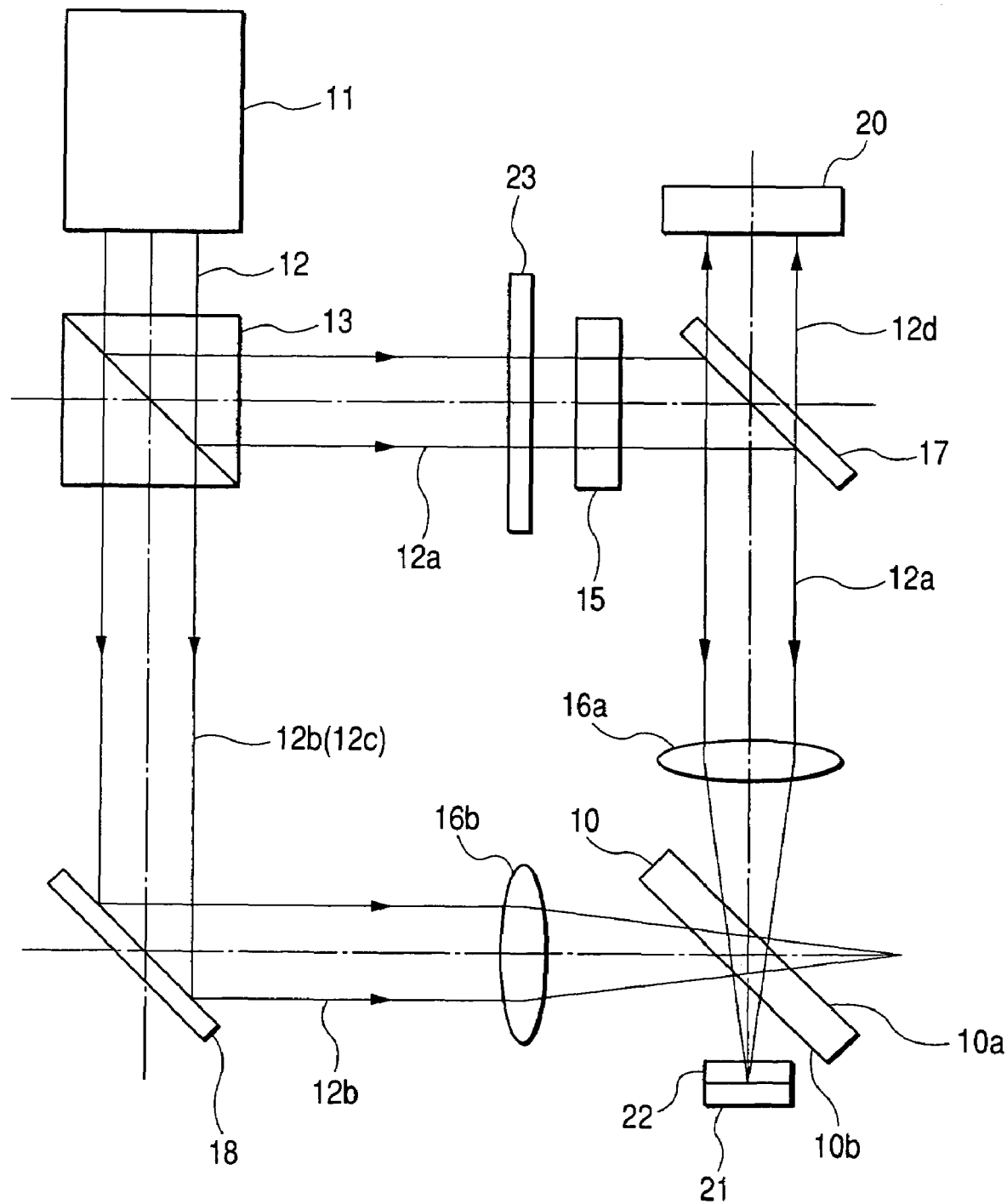
FIG. 10 is a schematic view of the configuration of optical information recording apparatus and optical information reproduction apparatus according to the fourth embodiment of the invention.
Figure 11:
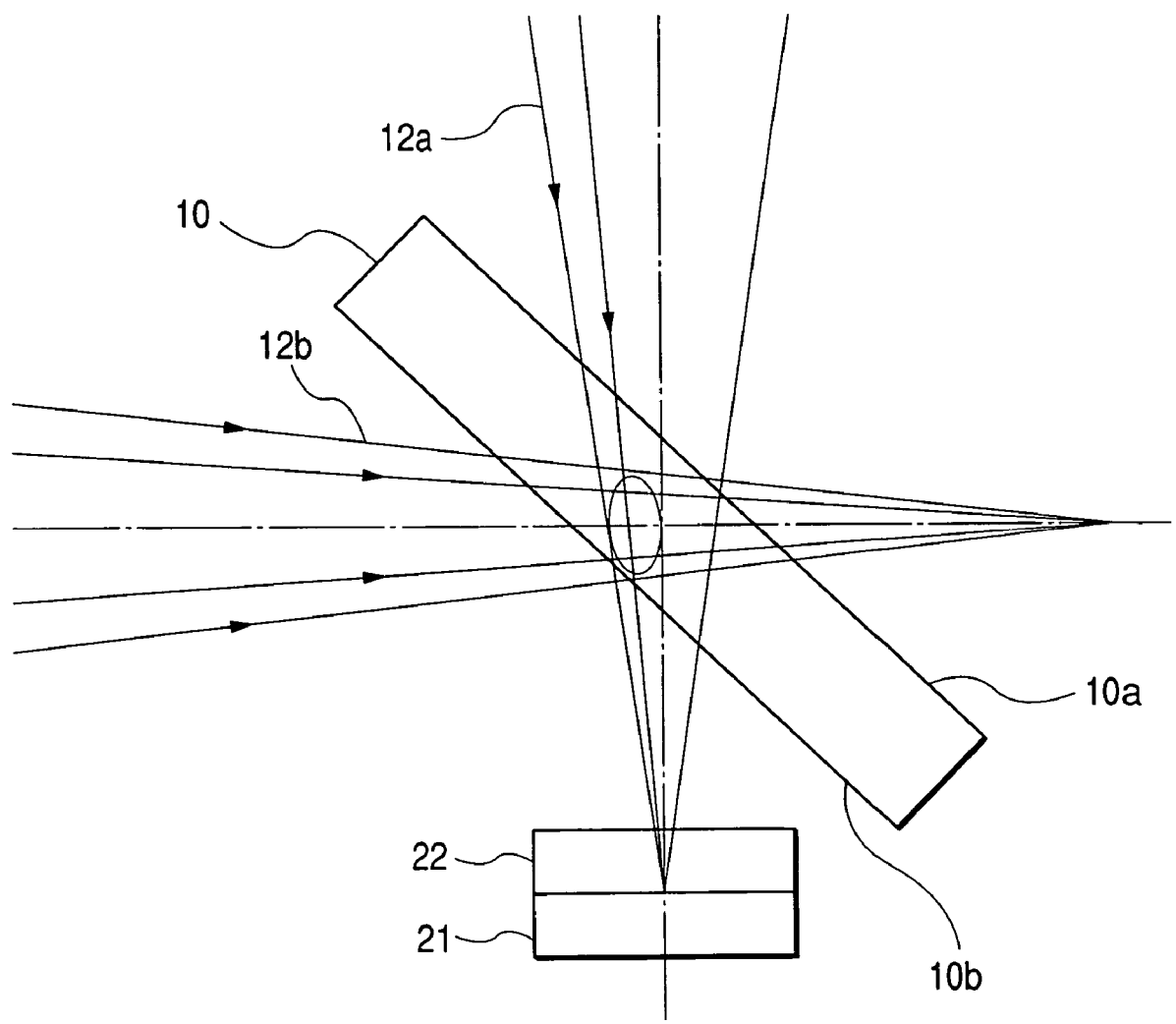
FIG. 11 is an enlarged view of an optical information recording medium and reflection apparatus which illustrates operation of recording in the fourth embodiment.
Figure 12:
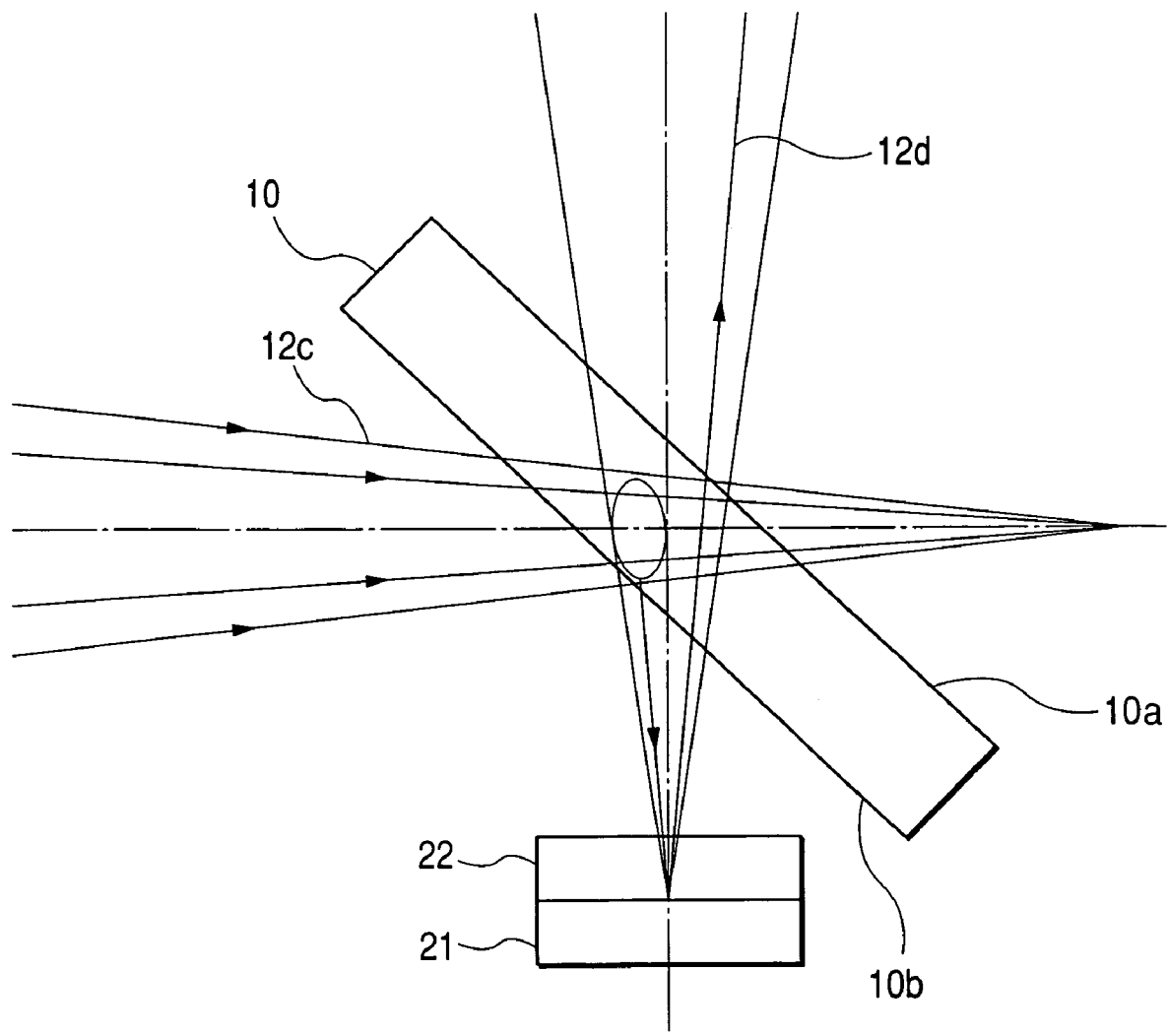
FIG. 12 is an enlarged view of the optical information recording medium and the reflection apparatus which illustrates operation of reproduction in the fourth embodiment.

Optical information recording apparatus and optical information reproduction apparatus according to the fourth embodiment of the invention are described below referring to FIGS. 10 through 12. FIG. 10 is a schematic view of the configuration of optical information recording apparatus and optical information reproduction apparatus according to the fourth embodiment of the invention. FIG. 11 is an enlarged view of an optical information recording medium and reflection apparatus which illustrates operation of recording. FIG. 12 is an enlarged view of the optical information recording medium and the reflection apparatus which illustrates operation of reproduction.

Configuration of the optical information recording apparatus and the optical information reproduction apparatus according to the fourth embodiment of the invention is described below referring to FIG. 10. As shown in FIG. 10, the optical information recording and reproduction apparatus of the fourth embodiment comprises the same optical system as the optical information recording and reproduction apparatus of the third embodiment. The optical information recording medium of the third embodiment is arranged at an angle of 90 degrees with respect to the optical system.

Operation of the optical information recording and reproduction apparatus according to this embodiment is described below separately for recording and reproduction of information.

Operation of recording is described below referring to FIGS. 10 and 11. As shown in FIG. 10, a luminous flux 12 emitted from the light source 11 is split by a polarization beam splitter (PBS) 13 into two luminous fluxes, an information beam 12a and a 12b. The polarization direction of the information beam 12a is the S-polarization direction while the polarization direction of the recording reference beam 12b is the P-polarization direction.

The information beam 12a as S-polarization is incident on the polarization rotation apparatus 23. The information beam 12a as S-polarization incident on the polarization rotation apparatus 23 is converted to P-polarization. The information beam 12a is then modulated based on recorded data by the spatial light modulator (SLM) 15. The information beam 12a is reflected by the half mirror 17, condensed by the objective lens 16a, and incident on the surface 10a of the optical information recording medium.

The recording reference beam 12b is reflected by the mirror 18, condensed by the objective lens 16b, and incident on the surface 10b of the optical information recording medium.

The state of each of the information beam 12a and the recording reference beam 12b in the optical information recording medium is described below referring to FIG. 11. The information beam 12a and the recording reference beam 12b are incident on the optical information recording medium via separate optical paths. The recording reference beam 12b is incident on one surface 10b of the optical information recording medium and the information beam 12a is incident on the surface 10a different from the surface 10b on which the recording reference beam 12b is incident. In this practice, both of the information beam 12a and the recording reference beam 12b are P-polarization so that they interfere with each other inside the optical information recording medium to form an interference pattern (reflection hologram). The optical information recording medium records the interference pattern.

Operation of reproduction is described below referring to FIGS. 10 and 12. As shown in FIG. 10, in reproduction of information, all the pixels in the spatial light modulator (SLM) 15 are controlled so that they will intercept light, in this case the information beam 12a. The reproduction reference beam 12c as P-polarization split by the polarization beam splitter (PBS) 13 is incident on the surface 10b of the optical information recording medium via the same optical path as the recording reference beam 12b.

The state of the reproduction reference beam 12c in the optical information recording medium is described below referring to FIG. 12. The reproduction reference beam 12c is incident on the surface 10b of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10b of the optical information recording medium and reflected coaxially by the reflection apparatus 21. Control is made so that the reproduction beam 12d will make a round trip from the 10 to a polarization controller 22 arranged between the optical information recording medium and the reflection apparatus 21 and the polarization direction will change from P-polarization direction to S-polarization direction. The reproduction beam 12d incident on the surface 10b of the optical information recording medium again is S-polarization and the reproduction reference beam 12c is P-polarization. The polarization directions differ by 90 degrees so that both beams do not interfere with each other. The reproduction beam 12d passes through the objective lens 16a and the half mirror 17, and is incident on the light receiving element 20. The original data is then reproduced.

While the polarization rotation apparatus is arranged on the optical path of the information beam 12a in this embodiment, the invention is not limited thereto and the polarization rotation apparatus 23 may be arranged on the optical path of the recording reference beam 12b.

With the optical system configured as mentioned above, the information beam 12a is condensed so that it will be surely focused on the reflective surface of the reflection apparatus 21 and the optical path of the reproduction beam 12d reflected by the reflection apparatus 21 is kept constant. This eliminates the need for re-focusing by controlling the position of the optical system and/or optical information recording medium each time recording or reproduction of information is performed, even in case the optical information recording medium is moved or changed. It is possible to arrange an optical system on one side only with respect to the optical information recording medium. This simplifies the configuration of the optical system and provides a more compact apparatus design than in the related art.

Fifth Embodiment

Figure 13:
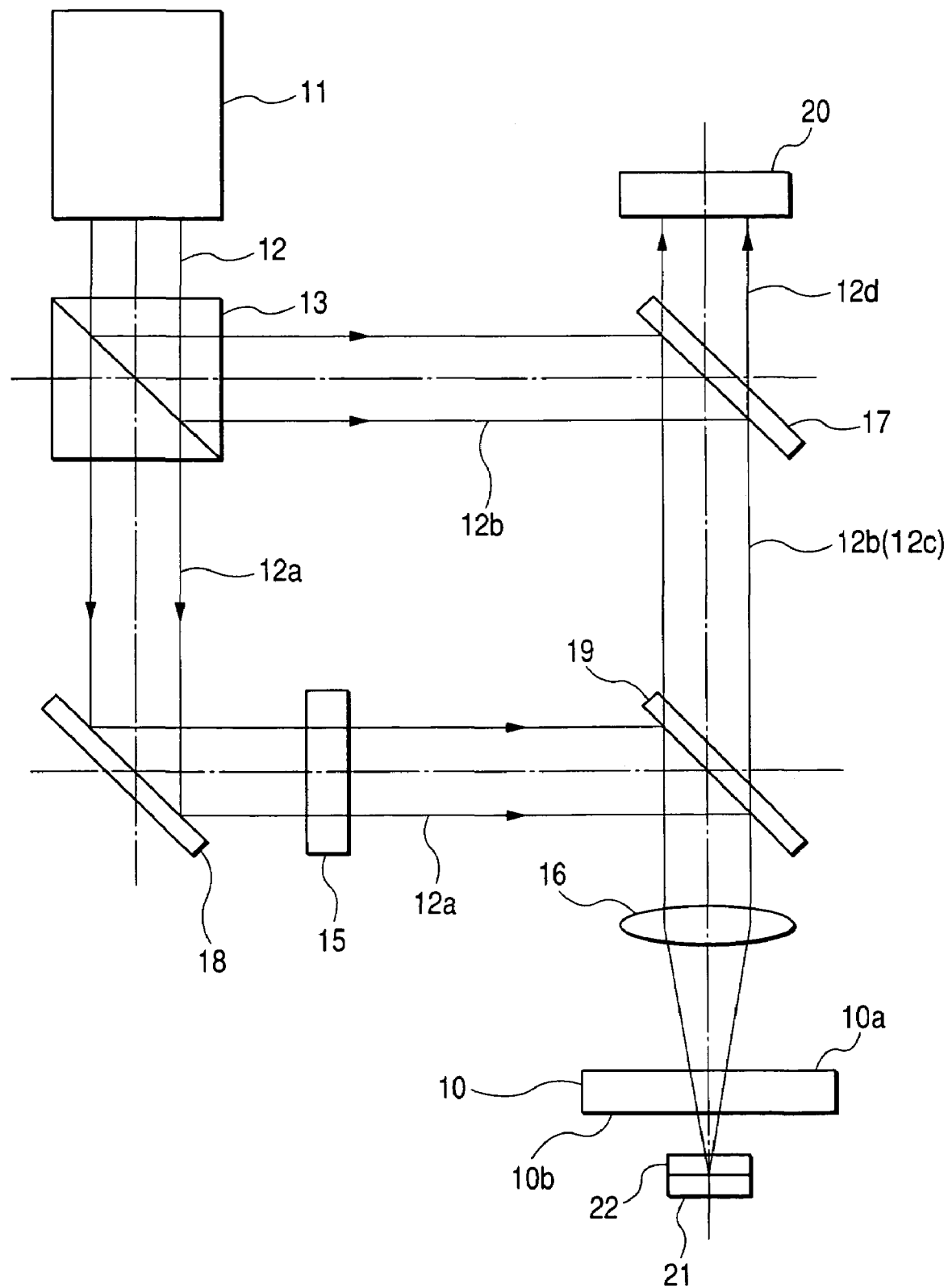
FIG. 13 is a schematic view of configuration of optical information recording apparatus and optical information reproduction apparatus according to the fifth embodiment of the invention.

Optical information recording apparatus and optical information reproduction apparatus according to the fifth embodiment of the invention are described below referring to FIGS. 13 through 17. FIG. 13 is a schematic view of the configuration of optical information recording apparatus and optical information reproduction apparatus according to the fifth embodiment. FIGS. 14 and 16 are enlarged views of an optical information recording medium and reflection apparatus which illustrate operation of recording. FIGS. 15 and 17 are enlarged views of the optical information recording medium and the reflection apparatus which illustrate operation of reproduction.

Configuration of the optical information recording apparatus and the optical information reproduction apparatus according to the fifth embodiment of the invention is described below referring to FIG. 13. As shown in FIG. 13, the optical information recording and reproduction apparatus of the fifth embodiment comprises a light source 11, a polarization beam splitter (PBS) 13, a spatial light modulator (SLM) 15, an objective lens 16a, half mirrors 17 and 19, a mirror 18, a light receiving element 20, reflection apparatus 21, and a polarization controller 22.

As shown in FIG. 10, a luminous flux 12 emitted from the light source 11 is split by a polarization beam splitter (PBS) 13 into two luminous fluxes, an information beam 12a and a 12b.

On the optical path of the information beam 12a are arranged a polarization beam splitter (PBS) 13, a mirror 18, a spatial light modulator (SLM) 15, a half mirror 17, an objective lens 16a, an optical information recording medium, a polarization controller 22 and reflection apparatus 21 in this order. On the optical path of the recording reference beam 12b are arranged a polarization beam splitter (PBS) 13, half mirrors 17, 19, an objective lens 16, an optical information recording medium, a polarization controller 22 and reflection apparatus 21 in this order.

The optical information recording medium is arranged so that the information beam 12a and the recording reference beam 12b which have passed the objective lens 16 are incident normal to the surface 10a of the optical information recording medium. The light receiving element 20 is arranged on the opposite side of the optical information recording medium across the half mirrors 17, 19 and the objective lens 16. The reflection apparatus 21 is arranged on the opposite side of an optical system comprising the polarization beam splitter (PBS) 13 and the objective lens 16a cross the optical information recording medium. The reflection apparatus 21 is also arranged in orthogonal direction to the optical axes of the information beam 12a and the recording reference beam 12b so that the information beam 12a and the recording reference beam 12b condensed by the objective lens 16 will be irradiated normal to the reflection apparatus 21. The polarization controller 22 is arranged between the optical information recording medium and the reflection apparatus 21. In this embodiment, the polarization controller 22 is arranged on the reflection apparatus 21.

Operation of the optical information recording and reproduction apparatus according to this embodiment is described below separately for recording and reproduction of information.

Operation of recording is described below referring to FIGS. 13 and 14. As shown in FIG. 13, a luminous flux 12 emitted from the light source 11 is split by a polarization beam splitter (PBS) 13 into two luminous fluxes, an information beam 12a as P-polarization and a 12b as S-polarization.

The information beam 12a is reflected by the mirror 18, incident on the spatial light modulator (SLM) 15, and modulated based on recorded data. The information beam 12a is then reflected by the half mirror 17, passes through the objective lens 16, is incident normal to the surface 10a of the optical information recording medium, and is condensed so that it will be focused on the reflective surface of the reflection apparatus 21.

The recording reference beam 12b is reflected by the half mirror 17 toward the optical information recording medium. The recording reference beam 12b then passes through the half mirror 19 and the objective lens 16, is incident normal to the surface 10a of the optical information recording medium, and is condensed so that it will be focused on the reflective surface of the reflection apparatus 21.

As a result, the information beam 12a and the recording reference beam 12b are irradiated by the same objective lens 16 along the same axis onto the optical information recording medium and are condensed so that they will be focused on the reflective surface of the reflection apparatus 21.

The state of each of the information beam 12a and the recording reference beam 12b in the optical information recording medium is described below referring to FIG. 14. The information beam 12a is P-polarization and the recording reference beam 12b is S-polarization. The polarization directions differ by 90 degrees so that both beams do not interfere with each other.

The recording reference beam 12b incident on the surface 10a of the optical information recording medium passes through the optical information recording medium and is reflected coaxially by the reflection apparatus 21. Control is made so that the recording reference beam 12b will make a round trip from the optical information recording medium to a polarization controller 22 arranged between the optical information recording medium and the reflection apparatus 21 and the polarization direction will change from S-polarization direction to P-polarization direction. The recording reference beam 12b is irradiated normal to the reflection apparatus 21, so that the optical path of the recording reference beam 12b irradiated onto the reflection apparatus 21 matches that of the recording reference beam 12b reflected. The recording reference beam 12b as P-polarization is incident on the surface 10a of the optical information recording medium and interferes with the information beam 12a as P-polarization incident on the surface 10a inside the optical information recording medium to form an interference pattern. The optical information recording medium records the interference pattern.

Operation of reproduction is described below referring to FIGS. 13 and 15. As shown in FIG. 13, in reproduction of information, all the pixels in the spatial light modulator (SLM) 15 are controlled so that they will intercept light, in this case the information beam 12a. The reproduction reference beam 12c as S-polarization split by the polarization beam splitter (PBS) 13 is incident on the surface 10a of the optical information recording medium via the same optical path as the recording reference beam 12b.

Next, the state of the reproduction reference beam 12c in the optical information recording medium is described below referring to FIG. 15. The reproduction reference beam 12c is temporarily incident normal to one surface 10a of the optical information recording medium and passes through the optical information recording medium. The information beam 12a which has passed through the optical information recording medium is reflected coaxially by the reflection apparatus 21 and is incident on the surface 10b of the optical information recording medium. Control is made so that the reproduction reference beam 12c will make around trip from the optical information recording medium to a polarization controller 22 arranged between the optical information recording medium and the reflection apparatus 21 and the polarization direction will change from S-polarization direction to P-polarization direction.

The reproduction reference beam 12c as P-polarization is incident on the surface 10b of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10b of the optical information recording medium, reflected coaxially by the reflection apparatus 21, and incident on the surface 10b of the optical information recording medium. Control is made so that the reproduction beam 12d will make a round trip from the optical information recording medium to a polarization controller 22 and the polarization direction will change from P-polarization direction to S-polarization direction. The reproduction beam 12d passes through the optical information recording medium, the objective lens 16a and the half mirrors 19 and 17, and is incident on the light receiving element 20. The original data is then reproduced.

The above-mentioned recording and reproduction method uses the interference pattern caused by the interference of the information beam 12a as P-polarization and the recording reference beam 12b as P-polarization. A method using the interference pattern caused by S-polarization is described below referring to FIGS. 16 and 17.

The state of each of the information beam 12a and the recording reference beam 12b in the optical information recording medium is described below referring to FIG. 16. The information beam 12a incident on the surface 10a of the optical information recording medium passes through the optical information recording medium and is reflected coaxially by the reflection apparatus 21. Control is made so that the information beam 12a will make a round trip from the optical information recording medium to a polarization controller 22 arranged between the optical information recording medium and the reflection apparatus 21 and the polarization direction will change from S-polarization direction to P-polarization direction. The information beam 12a as S-polarization is incident on the surface 10b of the optical information recording medium and interferes with the recording reference beam 12b as S-polarization incident on the surface 10a inside the optical information recording medium to form an interference pattern. The optical information recording medium records the interference pattern.

The state of the reproduction reference beam 12c in the optical information recording medium is described below referring to FIG. 17. The reproduction reference beam 12c is incident normal to one surface 10a of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10a of the optical information recording medium, passes through the objective lens 16, and is incident on the light receiving element 20. The original data is then reproduced.

With the optical system configured as mentioned above, the information beam 12a is condensed so that it will be surely focused on the reflective surface of the reflection apparatus 21 and the information beam 12a and the recording reference beam 12b are irradiated coaxially into the optical information recording medium. As a result, the optical path of the information beam 12a and the recording reference beam 12b as well as that of the reproduction reference beam 12c and the reproduction beam 12d are kept constant. This eliminates the need for re-focusing by controlling the position of the optical system and/or optical information recording medium each time recording or reproduction of information is performed, even in case the optical information recording medium is moved or changed. It is possible to arrange an optical system on one side only with respect to the optical information recording medium. This simplifies the configuration of the optical system and provides a more compact apparatus design than in the related art.

Sixth Embodiment

Optical information recording apparatus and optical information reproduction apparatus according to the sixth embodiment of the invention are described below referring to FIGS. 18 through 22. This embodiment is characterized by a combination of two optical systems similar to that of the fifth embodiment in which the wavelength of the light source differs from each other.

Figure 18:
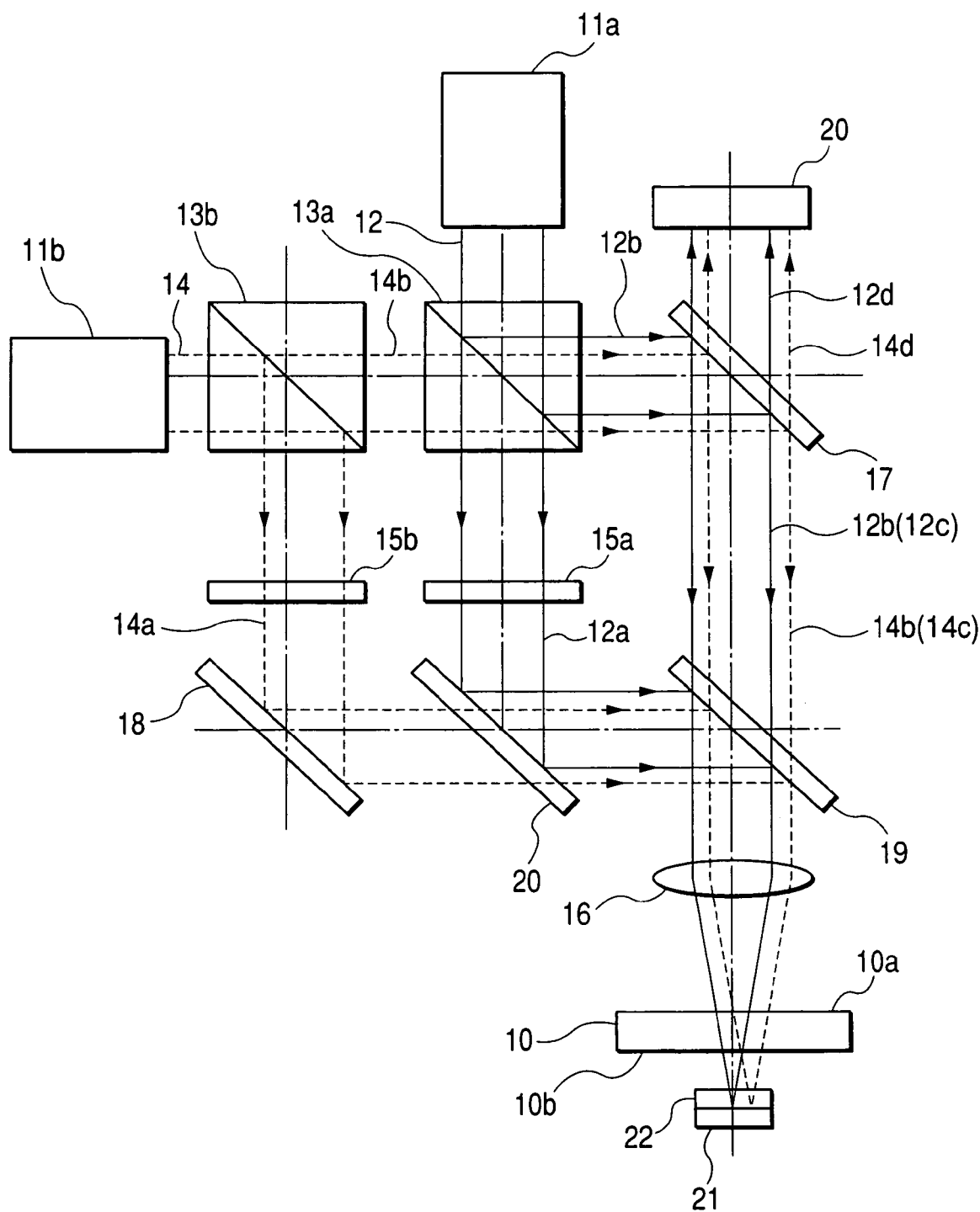
FIG. 18 is a schematic view of the configuration of optical information recording apparatus and optical information reproduction apparatus according to the sixth embodiment.

FIG. 18 is a schematic view of the configuration of optical information recording apparatus and optical information reproduction apparatus according to the sixth embodiment. FIGS. 19 and 20 are enlarged views of an optical information recording medium and reflection apparatus which illustrate operation of recording. FIGS. 21 and 22 are enlarged views of the optical information recording medium and the reflection apparatus which illustrate operation of reproduction.

Configuration of the optical information recording apparatus and the optical information reproduction apparatus according to the sixth embodiment of the invention is described below referring to FIG. 18. As shown in FIG. 18, the optical information recording and reproduction apparatus of the sixth embodiment comprises light sources 11a, 11b, a polarization beam splitters (PBSs) 13a, 13b, an objective lens 16, spatial light modulators (SLMs) 15s, 15b, half mirrors 17, 19, a mirror 18, a light receiving element 20, reflection apparatus 21, and a polarization controller 22.

The light sources 11a and 11b each uses a laser light source emitting a luminous flux whose wave length differs from each other. For example, the light source 11a is a YAG laser having the wavelength of 532 nm. The light source 11a is a He—Ne laser having the wavelength of 632.8 nm. The luminous flux 12 (solid lines in FIG. 18) is split into an information beam 12a and a recording reference beam 12b by the polarization beam splitter (PBS) 13a. The luminous flux 14 emitted from the light source 11b (dashed lines in FIG. 18) is split into an information beam 14a and a recording reference beam 14b by the polarization beam splitter (PBS) 13b.

On the optical path of the information beam 12a are arranged a polarization beam splitter (PBS) 13a, a spatial light modulator (SLM) 15a, a half mirror 20, a half mirror 19, an objective lens 16, an optical information recording medium, a polarization controller 22 and reflection apparatus 21 in this order. On the optical path of the recording reference beam 12b are arranged a polarization beam splitter (PBS) 13a, a half mirror 17, a half mirror 19, an objective lens 16, an optical information recording medium, a polarization controller 22 and reflection apparatus 21 in this order.

On the optical path of the information beam 14a are arranged a polarization beam splitter (PBS) 13b, a spatial light modulator (SLM) 15b, a mirror 18, a half mirror 20, a half mirror 19, an objective lens 16, an optical information recording medium, a polarization controller 22 and reflection apparatus 21 in this order. On the optical path of the recording reference beam 14b are arranged a polarization beam splitter (PBS) 13b, a polarization beam splitter (PBS) 13a, a half mirror 17, a half mirror 19, an objective lens 16, an optical information recording medium, a polarization controller 22 and reflection apparatus 21 in this order.

The optical information recording medium is arranged so that the information beam 12a (14a) and the recording reference beam 12b (14b) which have passed the objective lens 16 are incident normal to the surface 10a of the optical information recording medium. The light receiving element 20 is arranged on the opposite side of the optical information recording medium across the half mirrors 17, 19 and the objective lens 16. The reflection apparatus 21 is arranged on the opposite side of an optical system comprising the polarization beam splitters (PBSs) 13a, 13b and the objective lens 16 across the optical information recording medium. The reflection apparatus 21 is also arranged in orthogonal direction to the optical axes of the information beam 12a (14a) and the recording reference beam 12b (14b) so that the information beam 12a (14a) and the recording reference beam 12b (14b) condensed by the objective lens 16 will be irradiated normal to the reflection apparatus 21. The polarization controller 22 is arranged between the optical information recording medium and the reflection apparatus 21.

Operation of the optical information recording and reproduction apparatus according to this embodiment is described below separately for recording and reproduction of information.

Operation of recording is described below referring to FIGS. 18 and 19. First, recording which uses the light source 11a is described. As shown in FIG. 18, a luminous flux 12 emitted from the light source 11a is split by a polarization beam splitter (PBS) 13a into two luminous fluxes, an information beam 12a and a recording reference beam 12b. The polarization direction of the information beam 12a is the P-polarization direction while the polarization direction of the recording reference beam 12b is the S-polarization direction.

The information beam 12a is incident on the spatial light modulator (SLM) 15a and modulated based on recorded data. The information beam 12a is then reflected by the half mirrors 20 and 17, condensed by the objective lens 16, and incident normal to the surface 10a of the optical information recording medium.

The recording reference beam 12b is reflected by the half mirrors 17 and 19, condensed by the objective lens 16, and incident normal to the surface 10a of the optical information recording medium.

As a result, the information beam 12a and the recording reference beam 12b are condensed by the same objective lens 16 so that they will be focused on the reflective surface of the reflection apparatus 21 and is incident along the same axis on the optical information recording medium.

The state of each of the information beam 12a and the recording reference beam 12b in the optical information recording medium is described below referring to FIG. 19. The information beam 12a and the recording reference beam 12b are incident on the optical information recording medium via separate optical paths. The information beam 12a is P-polarization and the recording reference beam 12b is S-polarization. The polarization directions differ by 90 degrees so that both beams do not interfere with each other.

The information beam 12a incident on the surface 10a of the optical information recording medium passes through the optical information recording medium and is reflected coaxially by the reflection apparatus 21. Control is made so that the information beam 12a will make a round trip from the optical information recording medium to a polarization controller 22 arranged between the optical information recording medium and the reflection apparatus 21 and the polarization direction will change from P-polarization direction to S-polarization direction. The recording reference beam 12b is irradiated normal to the reflection apparatus 21, so that the optical path of the information beam 12a irradiated onto the reflection apparatus 21 matches that of the information beam 12a reflected. The information beam 12a as S-polarization is incident on the surface 10b of the optical information recording medium and interferes with the recording reference beam 12b as S-polarization incident on the surface 10a inside the optical information recording medium to form an interference pattern. The optical information recording medium records the interference pattern.

Recording which uses the light source 11b is described below. A luminous flux 14 emitted from the light source 11b is split by a polarization beam splitter (PBS) 13a into two luminous fluxes, an information beam 14a as S-polarization and a recording reference beam 14b as P-polarization. The polarization direction of the information beam 14a is the S-polarization direction while the polarization direction of the recording reference beam 14b is the P-polarization direction.

The information beam 14a is incident on the spatial light modulator (SLM) 15b and modulated based on recorded data by the spatial light modulator (SLM) 15. The information beam 14a is reflected by the mirror 18 and the half mirror 20, passes through the half mirror 20, is reflected by the half mirror 19, is condensed by the objective lens 16, and is incident on the surface 10a of the optical information recording medium.

The recording reference beam 14b passes through the polarization beam splitter (PBS) 13a and is reflected by the half mirror 17. The information beam 14a the passes through the half mirror 19, is condensed by the objective lens 16, and is incident normal to the surface 10a of the optical information recording medium.

The state of each of the information beam 14a and the recording reference beam 14b in the optical information recording medium is described below referring to FIG. 20. The information beam 14a and the recording reference beam 14b are incident on the optical information recording medium via separate optical paths. The information beam 14a is S-polarization and the recording reference beam 14b is P-polarization. The polarization directions differ by 90 degrees so that both beams do not interfere with each other.

The information beam 14a incident on the surface 10a of the optical information recording medium passes through the optical information recording medium and is reflected coaxially by the reflection apparatus 21. Control is made so that the information beam 14a will make a round trip from the optical information recording medium to a polarization controller 22 arranged between the optical information recording medium and the reflection apparatus 21 and the polarization direction will change from S-polarization direction to P-polarization direction. The information beam 14a as P-polarization is incident on the surface 10b of the optical information recording medium and interferes with the recording reference beam 14b as P-polarization incident on the surface 10a inside the optical information recording medium to form an interference pattern. The optical information recording medium records the interference pattern.

Operation of reproduction is described below referring to FIGS. 18, 21 and 22. As shown in FIG. 18, in reproduction of information recorded using the light source 11a, all the pixels in the spatial light modulator (SLM) 15a are controlled so that they will intercept light, in this case the information beam 12a, The reproduction reference beam 12c as S-polarization split by the polarization beam splitter (PBS) 13a is incident on the surface 10a of the optical information recording medium via the same optical path as the recording reference beam 12b.

The state of the reproduction reference beam 12c in the optical information recording medium is described below referring to FIG. 21. The reproduction reference beam 12c is incident normal to one surface 10a of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10a of the optical information recording medium, passes through the objective lens 16, and is incident on the light receiving element 20. The information recorded using the light source 11a is then reproduced.

As shown in FIG. 18, in reproduction of information recorded using the light source 11b, all the pixels in the spatial light modulator (SLM) 15b are controlled so that they will intercept light, in this case the information beam 14a. The reproduction reference beam 14c as P-polarization split by the polarization beam splitter (PBS) 13b is incident on the surface 10a of the optical information recording medium via the same optical path as the recording reference beam 14b.

The state of the reproduction reference beam 14c in the optical information recording medium is described below referring to FIG. 22. The reproduction reference beam 14c is incident normal to one surface 10a of the optical information recording medium and is diffracted by a refractive index grating caused by an interference pattern formed in the optical information recording medium. The diffraction generates a reproduction beam 14d corresponding to the information beam 14a used in recording. The reproduction beam 14d is emitted from the surface 10a of the optical information recording medium, passes through the objective lens 16, and is incident on the light receiving element 20. The information recorded using the light source 11b is then reproduced.

In this way, it is possible to record and reproduce the information by using light sources having two separate wave lengths independently of each other. Each information item is independent, which increases the recording density of the optical information recording medium. The information using a light source of one wavelength can be recorded as control information.

Seventh Embodiment

Figure 23:
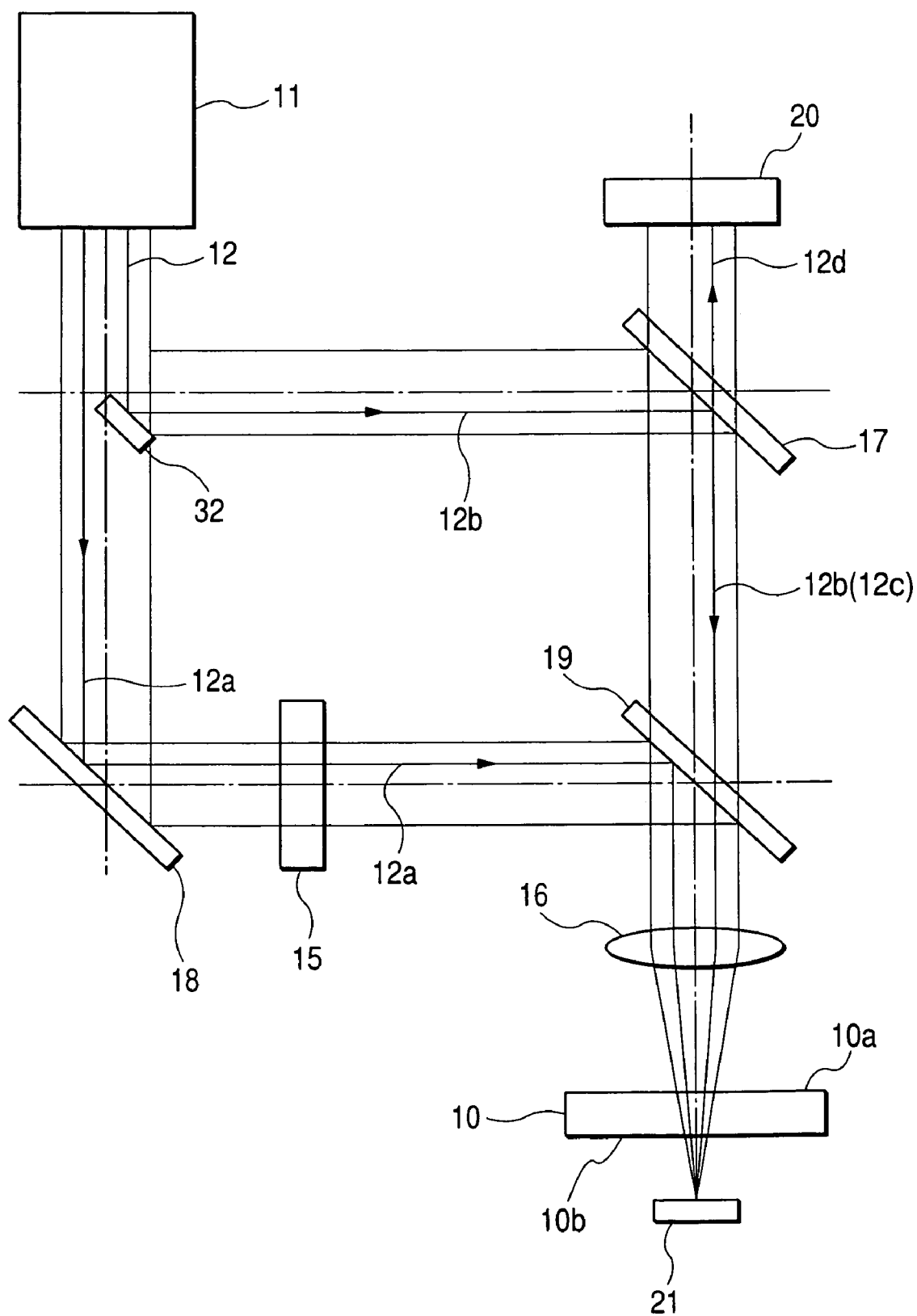
FIG. 23 is a schematic view of the configuration of optical information recording apparatus and optical information reproduction apparatus according to the seventh embodiment of the invention.
Figure 25:
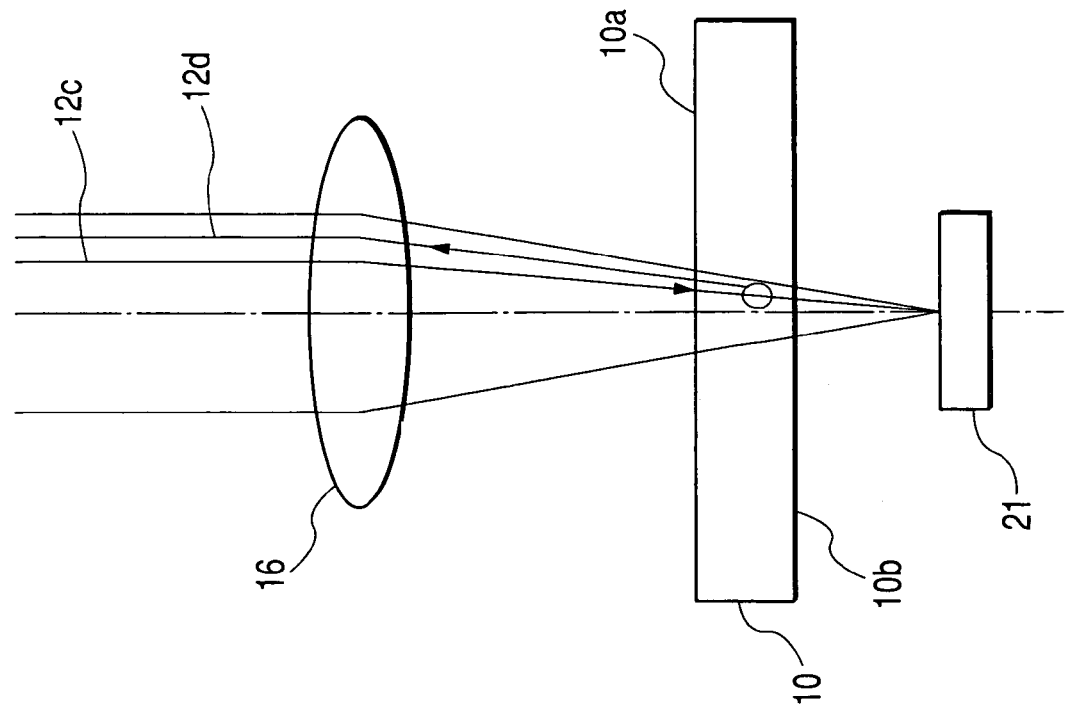
FIG. 25 is an enlarged view of the optical information recording medium and the reflection apparatus which illustrates operation of reproduction in the seventh embodiment.
Figure 24:
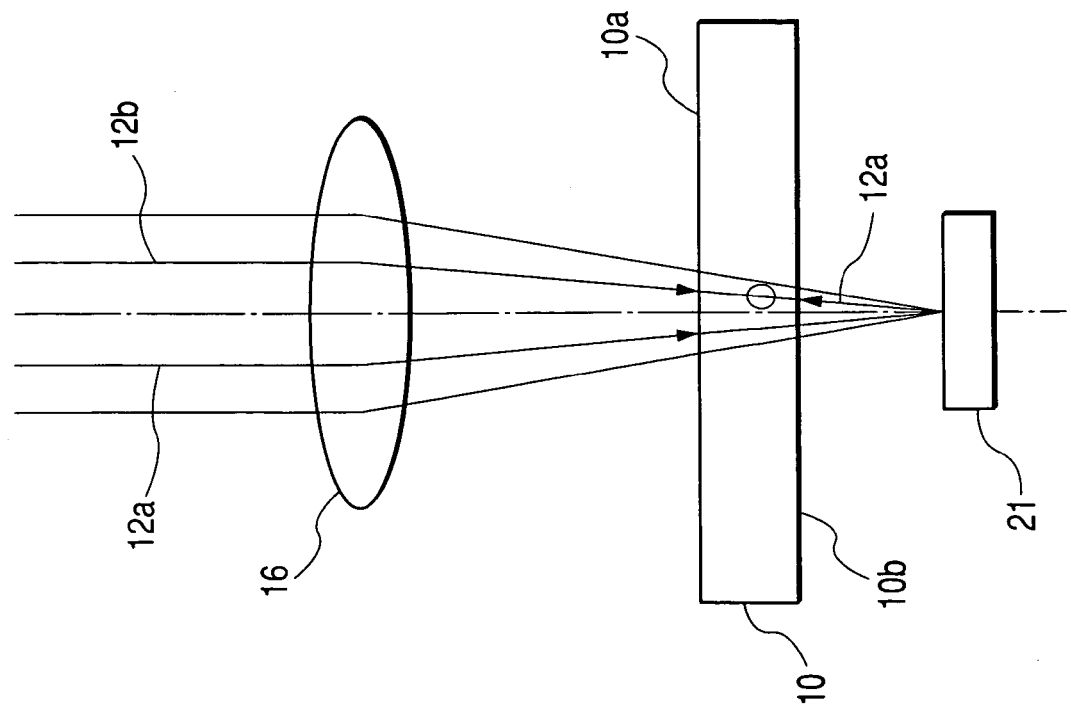
FIG. 24 is an enlarged view of an optical information recording medium and reflection apparatus which illustrates operation of recording in the seventh embodiment.
Figure 26:
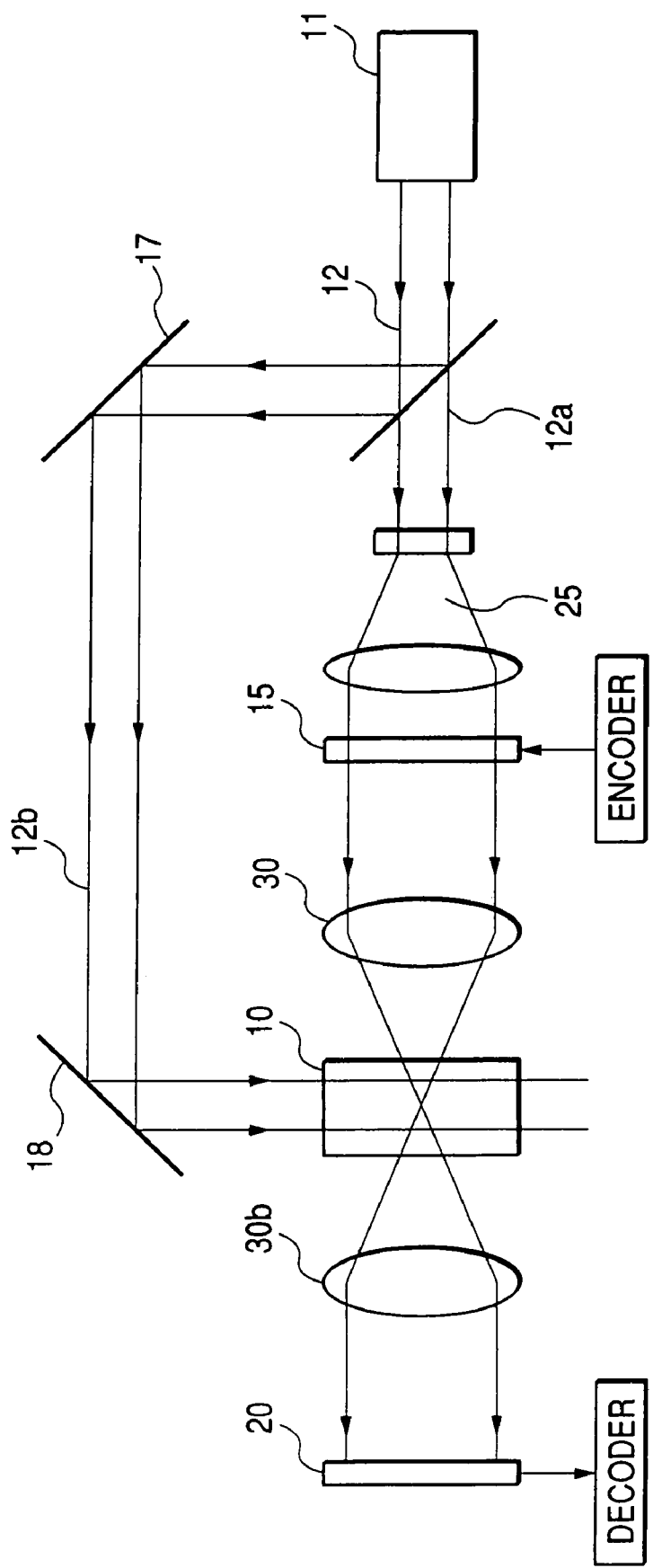
FIG. 26 is a schematic view of the configuration of optical information recording apparatus and optical information reproduction apparatus according to the related art.

Optical information recording apparatus and optical information reproduction apparatus according to the seventh embodiment of the invention are described below referring to FIGS. 23 through 25. This embodiment is characterized in that the embodiment does not comprise a polarization controller. FIG. 23 is a schematic view of the configuration of optical information recording apparatus and optical information reproduction apparatus according to the seventh embodiment. FIG. 24 is an enlarged view of an optical information recording medium and reflection apparatus which illustrates operation of recording. FIG. 25 is an enlarged view of the optical information recording medium and the reflection apparatus which illustrates operation of reproduction.

Configuration of the optical information recording apparatus and the optical information reproduction apparatus according to the seventh embodiment of the invention is described below referring to FIG. 23. As shown in FIG. 23, the optical information recording and reproduction apparatus of the seventh embodiment comprises a light source 11, a shutter 32, a spatial light modulator (SLM) 15, an objective lens 16, half mirrors 17 and 19, a mirror 18, a light receiving element 20, and reflection apparatus. The shutter 32 corresponds to the "luminous splitting means" of the invention.

A luminous flux 12 emitted from the light source 11 is split by the shutter 32 into two luminous fluxes, an information beam 12a and a 12b.

On the optical path of the information beam 12a are arranged a shutter 32, a mirror 18, a spatial light modulator (SLM) 15, a half mirror 17, an objective lens 16, an optical information recording medium, and reflection apparatus 21 in this order. On the optical path of the recording reference beam 12b are arranged a shutter 32, a half mirror 17, a half mirror 19, an objective lens 16, an optical information recording medium, and reflection apparatus 21 in this order.

The optical information recording medium is arranged so that the information beam 12a and the recording reference beam 12b which have passed the objective lens 16 are incident normal to the surface 10a of the optical information recording medium. The light receiving element 20 is arranged on the opposite side of the optical information recording medium across the half mirrors 17, 19 and the objective lens 16. The reflection apparatus 21 is arranged on the opposite side of an optical system comprising the shutter 32 and the objective lens 16 across the optical information recording medium. The reflection apparatus 21 is also arranged in orthogonal direction to the optical axes of the information beam 12a and the recording reference beam 12b so that the information beam 12a and the recording reference beam 12b condensed by the objective lens 16 will be irradiated normal to the reflection apparatus 21.

Operation of the optical information recording and reproduction apparatus according to this embodiment is described below separately for recording and reproduction of information.

Operation of recording is described below referring to FIGS. 23 and 24. As shown in FIG. 23, one half of a luminous flux 12 emitted from the light source 11 is reflected by the shutter 32, and the other half passes through the shutter 32. In this embodiment, the reflected luminous flux is assumed as a recording reference beam 12b and the transmitted luminous flux is assumed as an information beam 12a.

The information beam 12a is reflected by the mirror 18, incident on the spatial light modulator (SLM) 15, and modulated based on recorded data. The information beam 12a is then reflected by the half mirror 19, passes through the objective lens 16, is incident normal to the surface 10a of the optical information recording medium, and is condensed so that it will be focused on the reflective surface of the reflection apparatus 21.

The recording reference beam 12b is reflected by the half mirror 17 toward the optical information recording medium. The recording reference beam 12b then passes through the half mirror 19 and the objective lens 16, is incident normal to the surface 10a of the optical information recording medium, and is condensed so that it will be focused on the reflective surface of the reflection apparatus 21.

As a result, the information beam 12a and the recording reference beam 12b are irradiated by the same objective lens 16 along the same axis onto the optical information recording medium and are condensed so that they will be focused on the reflective surface of the reflection apparatus 21.

The state of each of the information beam 12a and the recording reference beam 12b in the optical information recording medium is described below referring to FIG. 24.

The recording reference beam 12b incident on the surface 10a of the optical information recording medium passes through the optical information recording medium and is reflected coaxially by the reflection apparatus 21. The information beam 12a is incident on the surface 10b of the optical information recording medium and interferes with the recording reference beam 12b incident on the surface 10a inside the optical information recording medium to form an interference pattern. The optical information recording medium records the interference pattern.

Operation of reproduction is described below referring to FIGS. 23 and 25. As shown in FIG. 23, in reproduction of information, all the pixels in the spatial light modulator (SLM) 15 are controlled so that they will intercept light, in this case the information beam 12a. The reproduction reference beam 12c as S-polarization split by the shutter 32 is incident on the surface 10a of the optical information recording medium via the same optical path as the recording reference beam 12b.

Next, the state of the reproduction reference beam 12c in the optical information recording medium is described below referring to FIG. 25. The reproduction reference beam 12c is incident on the surface 10a of the optical information recording medium and is diffracted by a refractive index grating caused by an interference pattern formed in the optical information recording medium. The diffraction generates a reproduction beam 12d corresponding to the information beam 12a used in recording. The reproduction beam 12d is emitted from the surface 10a of the optical information recording medium, passes through optics such as the objective lens 16 and is incident on the light receiving element 20. The original data is then reproduced.

The optical system configured as mentioned above eliminates the need for re-focusing by controlling the position of the optical system and/or optical information recording medium each time recording or reproduction of information is performed, even in case the optical information recording medium is moved or changed. It is possible to arrange an optical system on one side only with respect to the optical information recording medium. This simplifies the configuration of the optical system and provides a more compact apparatus design than in the related art.

According to the invention, it is possible to arrange an optical system on one side only with respect to an optical information recording medium by arranging reflection apparatus on the opposite side of the information beam irradiation means across the optical information recording medium. This simplifies the configuration of the optical system and provides a more compact apparatus design. Further, it is possible to condense an information beam so that it will be surely focused on the reflection apparatus by arranging the reflection apparatus externally to the optical information recording medium. This eliminates the need for re-focusing by controlling the position of the optical system and/or optical information recording medium each time recording or reproduction of information is performed, even in case the optical information recording medium is moved or changed.

According to the invention, the optical path of an information beam before reflection surely matches that of the information beam after reflection by coaxially reflecting the information beam by way of reflection means. This eliminates the need for re-focusing by controlling the position of the optical system and/or optical information recording medium each time recording or reproduction of information is performed, even in case the optical information recording medium is moved or changed.

Further, according to the invention, an information beam and a recording reference beam are irradiated coaxially onto an optical information recording medium. This eliminates the need for re-focusing by controlling the position of the optical system and/or optical information recording medium each time recording or reproduction of information is performed, even in case the optical information recording medium is moved or changed.

Further, according to the invention, it is possible to simplify the configuration of the optical system and provide a more compact apparatus design. It is also possible to eliminate the need for re-focusing by controlling the position of the optical system and/or optical information recording medium each time recording or reproduction of information is performed, even in case the optical information recording medium is moved or changed.

Further, according to the invention, reflective apparatus is arranged on the opposite side of the information beam irradiation means across the optical information recording medium. This simplifies the configuration of the optical system and provides a more compact apparatus design. Also, reflective apparatus is arranged externally to the optical information recording medium. This eliminates the need for re-focusing by controlling the position of the optical system and/or optical information recording medium each time recording or reproduction of information is performed, even in case the optical information recording medium is moved or changed.

Further according to invention, the optical path of a reproduction beam before reflection surely matches that of the reproduction beam after reflection by coaxially reflecting the reproduction beam. This eliminates the need for re-focusing by controlling the position of the optical system and/or optical information recording medium each time recording or reproduction of information is performed, even in case the optical information recording medium is moved or changed.

Further, according to the invention, reflection apparatus is arranged on the opposite side of the information beam irradiation means across the optical information recording medium. This simplifies the configuration of the optical system and provides a more compact apparatus design. Further, the reflection apparatus is arranged externally to the optical information recording medium. This eliminates the need for re-focusing by controlling the position of the optical system and/or optical information recording medium each time recording or reproduction of information is performed, even in case the optical information recording medium is moved or changed.

What is claimed:

1. Optical information recording apparatus comprising:
   recording reference beam irradiation means for irradiating a recording reference beam onto an optical information recording medium;
   information beam irradiation means for irradiating an information beam carrying information onto a first surface of said optical information recording medium;
   reflection means for reflecting only said information beam passing through said optical information recording medium onto said optical information recording medium, said reflection means arranged externally to said optical information recording medium and on a second surface opposite to the first surface of said optical information recording medium, said recording reference beam irradiation means not irradiating said recording reference beam onto said reflection means;
   polarization control means between said optical information recording medium and said reflection means for matching a polarization direction of said information beam with a polarization direction of said recording reference beam; and
   recording means for recording onto said optical information recording medium an interference pattern generated by interference of said recording reference beam irradiated by said recording reference beam irradiation means and said information beam irradiated by said reflection means.

2. The optical information recording apparatus according to claim 1, further comprising:
   a light source for emitting a luminous flux;
   luminous flux splitting means for splitting a luminous flux emitted from said light source into two luminous fluxes; and
   information beam generation means for generating an information beam which carries information, said information beam obtained by spatially modulating one luminous flux split by said luminous flux splitting means;
   wherein said recording reference beam irradiation means irradiates, as said recording reference beam, the other luminous flux split by said luminous flux splitting means onto said optical information recording medium.

3. The optical information recording apparatus according to claim 1, wherein said reflection means reflects said information beam passing through said optical information recording medium onto said optical information recording medium.

4. The optical information recording apparatus according to claim 2, wherein said luminous flux splitting means splits the luminous flux emitted from said light source into two luminous fluxes whose polarization directions differ from each other.

5. The optical information recording apparatus according to claim 1, wherein said polarization control means is a quarter-wave plate.

6. The optical information recording apparatus according to any one of claims 1, 2, and 3, wherein said reflection means reflects said information beam onto the same surface of said optical information recording medium onto which said recording reference beam is irradiated.

7. The optical information recording apparatus according to any one of claims 1, 2 and 3, wherein said reflection means reflects said information beam onto a surface of said optical information recording medium different from the surface onto which said recording reference beam is irradiated.

8. The optical information recording apparatus according to claim 7, wherein said information beam irradiation means irradiates an information beam coaxially with said recording reference beam.

9. An optical information recording apparatus comprising:
a light source for emitting a luminous flux;
luminous flux splitting means for splitting a luminous flux emitted from said light source into two luminous fluxes whose polarization directions differ from each other;
polarization rotation means for matching the polarization direction of a first of the two luminous fluxes split by said luminous flux splitting means with that of a second of the two luminous fluxes by changing the polarization of only one of the first or the second of the two luminous fluxes,
information beam generation means for generating an information beam which carries information, said information beam obtained by spatially modulating a first of the two luminous fluxes split by said luminous flux splitting means;
information beam irradiation means for irradiating said information beam onto one surface of an optical information recording medium;
recording reference beam irradiation means for irradiating, as a recording reference beam, the second of the two luminous fluxes split by said luminous flux splitting means onto said optical information recording medium; and
recording means for recording onto said optical information recording medium an interference pattern generated by interference of said information beam irradiated by said information beam irradiation means and said recording reference beam irradiated by said recording reference beam irradiation means.

10. The optical information recording apparatus according to claim 9, wherein said information beam irradiation means irradiates said information beam onto the same surface of said optical information recording medium onto which said recording reference beam is irradiated.

11. The optical information recording apparatus according to claim 9, wherein said information beam irradiation means irradiates said information beam onto a surface of said optical information recording medium different from the surface onto which said recording reference beam is irradiated.

12. The optical information recording apparatus according to any one of claims 9 through 11, wherein said polarization rotation means is a half-wave plate.

13. An optical information recording method comprising:
irradiating a recording reference beam onto an optical information recording medium;
irradiating onto a first surface of said optical information recording medium an information beam carrying information to be recorded onto said optical information recording medium;
reflecting only said information beam passing through said optical information recording medium, by way of reflection means arranged externally to said optical information recording medium, onto a second surface opposite to said first surface of said optical information recording medium onto which said information beam is irradiated, not irradiating said recording reference beam onto said reflection means;
rotating a polarization direction of said information beam to match a polarization direction of said recording reference beam by way of polarization rotation means between said optical information recording medium and said reflection means; and
recording an interference pattern generated by interference of said information beam and said recording reference beam onto said optical information recording medium.

14. Optical information recording apparatus comprising:
a recording reference beam irradiation unit configured to irradiate a recording reference beam onto an optical information recording medium;
an information beam irradiation unit configured to irradiate an information beam carrying information onto a first surface of said optical information recording medium;
a reflector configured to reflect only said information beam passing through said optical information recording medium onto said optical information recording medium, said reflector arranged externally to said optical information recording medium and on a second surface opposite to the first surface of said optical information recording medium, said recording reference beam irradiation unit not irradiating said recording reference beam onto said reflector;
a polarization rotation unit, between the information recording medium and the reflector, configured to match a polarization direction of the information beam with a polarization direction of said recording reference beam; and
a recording unit configured to record onto said optical information recording medium an interference pattern generated by interference of said recording reference beam irradiated by said recording reference beam irradiation unit and said information beam irradiated by said reflector.

* * * * *